(12) United States Patent
Wang et al.

(10) Patent No.: US 9,042,648 B2
(45) Date of Patent: May 26, 2015

(54) SALIENT OBJECT SEGMENTATION

(75) Inventors: Jingdong Wang, Beijing (CN); Shipeng Li, Beijing (CN); Huaizu Jiang, Shaanxi Provi (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 147 days.

(21) Appl. No.: 13/403,747

(22) Filed: Feb. 23, 2012

(65) Prior Publication Data

US 2013/0223740 A1  Aug. 29, 2013

(51) Int. Cl.
  *G06K 9/34* (2006.01)
  *G06K 9/46* (2006.01)
  *G06T 7/00* (2006.01)

(52) U.S. Cl.
  CPC ............ *G06K 9/4638* (2013.01); *G06T 7/0083* (2013.01); *G06T 7/0087* (2013.01); *G06T 2207/10024* (2013.01); *G06T 2207/20016* (2013.01)

(58) Field of Classification Search
  CPC .............................. G06T 7/0083; G06K 9/4671
  See application file for complete search history.

(56) References Cited

U.S. PATENT DOCUMENTS

| | | | |
|---|---|---|---|
| 5,583,949 A * | 12/1996 | Smith et al. | 382/199 |
| 7,519,200 B2 | 4/2009 | Gokturk et al. | |
| 7,640,219 B2 | 12/2009 | Perrizo | |
| 7,659,894 B2 | 2/2010 | Keller et al. | |
| 7,933,915 B2 | 4/2011 | Singh et al. | |
| 7,940,985 B2 * | 5/2011 | Sun et al. | 382/173 |
| 7,966,327 B2 | 6/2011 | Li et al. | |
| 2002/0081033 A1 * | 6/2002 | Stentiford | 382/218 |
| 2002/0164074 A1 * | 11/2002 | Matsugu et al. | 382/173 |
| 2007/0003138 A1 * | 1/2007 | Hobson et al. | 382/173 |
| 2007/0297651 A1 * | 12/2007 | Schubert | 382/118 |
| 2008/0304740 A1 * | 12/2008 | Sun et al. | 382/168 |
| 2009/0245638 A1 | 10/2009 | Collier et al. | |
| 2010/0106713 A1 | 4/2010 | Esuli et al. | |
| 2010/0119147 A1 | 5/2010 | Blake et al. | |
| 2010/0124375 A1 | 5/2010 | Wu et al. | |
| 2011/0058733 A1 | 3/2011 | Inoue et al. | |
| 2011/0075927 A1 | 3/2011 | Xu et al. | |
| 2012/0275701 A1 | 11/2012 | Park et al. | |
| 2013/0132402 A1 | 5/2013 | Yang et al. | |

OTHER PUBLICATIONS

U.S. Appl. No. 13/545,253, Wang, et al., "Salient Object Segmentation", filed Jul. 10, 2012.

(Continued)

*Primary Examiner* — Tsung-Yin Tsai
(74) *Attorney, Agent, or Firm* — Dan Choi; Judy Yee; Micky Minhas

(57) ABSTRACT

Techniques for identifying a salient object with respect to its context are described. A process receives an input image that includes a salient object. The process segments the input image into multiple regions and calculates a saliency value for each of the segmented regions based on scale image levels. The process constructs saliency maps based at least in part on the calculated saliency value, and combines the saliency maps to construct a total saliency map. Next, the process connects a set of line segments computed from the input image and utilizes the total saliency map to compute a closed boundary, which forms a shape prior from the closed boundary, and extracts the salient object from the total saliency map and the shape prior.

20 Claims, 11 Drawing Sheets

(56) References Cited

OTHER PUBLICATIONS

Blaschko, et al., "Learning to Localize Objects with Structured Output Regression", In Proceedings of the 10th European Conference on Computer Vision: Part I, Oct. 12, 2008, 14 pages.
Chen, et al., "A Visual Attention Model for Adapting Images on Small Displays", In Journal of Multimedia Systems, vol. 9, No. 4, Oct. 2003, 12 pages.
Chen, et al., "Using Random Forest to Learn Imbalanced Data", In Technical Report of Statistics Department, University of California, Berkeley, Jul. 2004, 12 pages.
Dalal, et al., "Histograms of Oriented Gradients for Human Detection", In Proceedings of the IEEE Computer Society Conference on Computer Vision and Pattern Recognition, Jun. 25, 2005, 8 pages.
Feng, et al., "Salient Object Detection by Composition", In IEEE International Conference on Computer Vision, Nov. 6, 2011, 8 pages.
Girshick, et al., "Efficient Regression of General-Activity Human Poses from Depth Images", In Proceedings of the 13th International Conference on Computer Vision, Nov. 6, 2011, 8 pages.
Gopalakrishnan, et al., "Random Walks on Graphs for Salient Object Detection in Images", In IEEE Transactions on Image Processing, vol. 19, Issue 12, Dec. 2010, 11 pages.
Hou, et al., "Thumbnail Generation Based on Global Saliency", In 1st International Conference on Cognitive Neurodynamics, Nov. 17, 2007, 5 pages.
Jiang, et al., "Automatic Salient Object Segmentation Based on Context and Shape Prior", In Proceedings of the 22nd British Machine Vision Conference, Aug. 29, 2011, 12 pages.
Judd, et al., "Learning to Predict Where Humans Look", In Proceedings of IEEE International Conference on Computer Vision, Sep. 27, 2009, 8 pages.
Kadir, et al., "Saliency, Scale and Image Description", In International Journal of Computer Vision, vol. 45, Issue 2, Jun. 2001, 23 pages.
Liu, et al., "An Improved Image Segmentation Algorithm for SalientObject Detection", In Proceedings of 23rd International Conference Image and Vision Computing, Nov. 28, 2008, 6 pages.
Luo, et al., "Saliency Density Maximization for Object Detection and Localization", In Proceedings of the 10th Asian conference on Computer Vision—vol. Part III, Nov. 8, 2010, 12 pages.
Ma et al, "Contrast-based Image Attention Analysis by Using Fuzzy Growing," Proc 11 ACM Intl Conf on Multimedia, Nov. 2-8, 2003, pp. 374-381.
Marchesotti, et al., "A Framework for Visual Saliency Detection with Applications to Image Thumbnailing", In IEEE 12th International Conference on Computer Vision, Sep. 29, 2009, 8 pages.
Oliva, et al., "Modeling the Shape of the Scene: A Holistic Representation of the Spatial Envelope", In International Journal of Computer Vision, vol. 42, Issue 3, Jan. 2001, 31 pages.
Pauly, et al., "Fast Multiple Organ Detection and Localization in Whole-Body MR Dixon Sequences", In Proceedings of the 14th International Conference on Medical Image Computing and Computer-Assisted Intervention—vol. Part III, Sep. 18, 2011, 8 pages.
Rahtu, et al., "Learning Category Independent Object Detection Cascade", In Proceedings of the 13th International Conference on Computer Vision, Nov. 6, 2011, 8 pages.
Rother, et al., "GrabCut-Interactive Foreground Extraction using Iterated Graph Cuts", In Journal of ACM Transactions on Graphics, vol. 23, Issue 3, Aug. 2004, 6 pages.
Santella, et al., "Gaze-Based Interaction for Semi-Automatic Photo Cropping", In Proceedings of the SIGCHI Conference on Human Factors in Computing Systems, Apr. 22, 2006, 10 pages.
Shotton, et al., "Real-Time Human Pose Recognition in Parts from Single Depth Images", In Proceedings of the IEEE Conference on Computer Vision and Pattern Recognition, Jun. 20, 2011, 8 pages.
Silva, et al., "Multi-Scale Spectral Residual Analysis to Speed up Image Object Detection", In Conference on Graphics, Patterns and Images, Aug. 22, 2012, 8 pages.
Tu, et al., "Auto-Context and Its Application to High-Level Vision Tasks and 3D Brain Image Segmentation", In IEEE Transactions on Pattern Analysis and Machine Intelligence, vol. 32, No. 10, Oct. 2010, 14 pages.
Wang, et al., "Automatic Salient Object Extraction with Contextual Cue", In Proceedings of the 13th International Conference on Computer Vision, Nov. 6, 2011, 8 pages.
Wang, et al., "Simulating Human Saccadic Scanpaths on Natural Images", In Proceedings of the IEEE Conference on Computer Vision and Pattern Recognition, Jun. 20, 2011, 8 pages.
Zhang, et al., "An Adaptive Computational Model for Salient Object Detection", In IEEE Transactions on Multimedia, vol. 12, Issue 4, Jun. 2010, 17 pages.
Boutsidis, et al., "Random Projections for k-Means Clustering", In Proceedings of Advances in Neural Information Processing Systems, Dec. 2010, 9 pages.
Chum, et al., "Large-Scale Discovery of Spatially Related Images", In Proceedings of IEEE Transactions on Pattern Analysis and Machine Intelligence, vol. 32, Issue 2, Feb. 2010, 8 pages.
Davidson, et al., "A Survey of Clustering with Instance Level Constraints", In Proceedings of ACM Transactions on Knowledge Discovery from Data, Mar. 2007, 41 pages.
Elkan, Charles, "Using the Triangle Inequality to Accelerate k-Means", In Proceedings of the Twentieth International Conference on Machine Learning, Aug. 21, 2003, 7 pages.
Fei-Fei, et al., "Learning Generative Visual Models from Few Training Examples: An Incremental Bayesian Approach Tested on 101 Object Categories", In Proceedings of Computer Vision and Pattern Recognition Workshop, Jun. 27, 2004, 9 pages.
Fern, et al., "Random Projection for High Dimensional Data Clustering: A Cluster Ensemble Approach", In Proceedings of the Twentieth International Conference on Machine Learning, Aug. 21, 2003, 8 pages.
Frahling et al, "A Fast k-means Implementation Using Coresets", Int. Journal of Computational Geometry and Appl, Dec. 2008, 18(6), 10 pgs.
Jegou, et al., "Product Quantization for Nearest Neighbor Search", In Proceedings of IEEE Transactions on Pattern Analysis and Machine Intelligence, vol. 33, Issue 1, Jan. 2011, 12 pages.
Kanungo, et al., "An Efficient k-Means Clustering Algorithm: Analysis and Implementation", In Proceedings of IEEE Transactions on Pattern Analysis and Machine Intelligence, vol. 24, Issue 7, Jul. 2002, 12 pages.
Li et al, "Large Scale Robust Visual Codebook Construction", ACM Multimedia, Oct. 2010, 4 pgs.
Li, et al., "Modeling and Recognition of Landmark Image Collections using Iconic Scene Graphs", In Proceedings of the 10th European Conference on Computer Vision, Oct. 12, 2008, 14 pages.
Lloyd, Stuart P., "Least Squares Quantization in PCM", In Proceedings of IEEE Transactions on Information Theory, vol. 28, Issue 2, Mar. 1982, 9 pages.
MacQueen, J., "Some Methods for Classification and Analysis of Multivariate Observations", In Proceedings of the Fifth Berkeley Symposium on Mathematical Statistics and Probability, vol. 1, Nov. 23, 2012, 17 pages.
Mahajana, et al., "The Planar k Means Problem is NP-Hard", In Proceedings of the 3rd International Workshop on Algorithms and Computation, Feb. 18, 2009, 15 pages.
McCallum, et al., "Efficient Clustering of High-Dimensional Data Sets with Application to Reference Matching", In Proceedings of the Sixth ACM SIGKDD International Conference on Knowledge Discovery and Data Mining, Aug. 20, 2000, 10 pages.
Muja, et al., "Fast Approximate Nearest Neighbors with Automatic Algorithm Configuration", In Proceedings of the Fourth International Conference on Computer Vision Theory and Applications, vol. 1, Feb. 5, 2009, 10 pages.
Nister, et al., "Scalable Recognition with a Vocabulary Tree", In Proceedings of IEEE Computer Society Conference on Computer Vision and Pattern Recognition, Jun. 17, 2006, 8 pages.
Philbin, et al., "Object Mining Using a Matching Graph on Very Large Image Collections", In Proceedings of the Sixth Indian Conference on Computer Vision, Graphics & Image Processing, Dec. 17, 2008, 8 pages.

(56) References Cited

OTHER PUBLICATIONS

Philbin, et al., "Object Retrieval with Large Vocabularies and Fast Spatial Matching", In Proceedings of IEEE Computer Society Conference on Computer Vision and Pattern Recognition, Jun. 18, 2007, 8 pages.
Raguram, et al., "Modeling and Recognition of Landmark Image Collections Using Iconic Scene Graphs", In International Journal of Computer Vision, vol. 95, Issue 3, Dec. 16, 2011, 28 pages.
Sculley, D., "Web-Scale k-Means Clustering", In Proceedings of the 19th International Conference on World Wide Web, Apr. 26, 2010, 2 pages.
Simon, et al., "Scene Summarization for Online Image Collections", In Proceedings of IEEE 11th International Conference on Computer Vision, Oct. 14, 2007, 8 pages.
Sivic, et al., "Video Google: A Text Retrieval Approach to Object Matching in Videos", In Proceedings of the Ninth IEEE International Conference on Computer Vision, Oct. 13, 2003, 8 pages.
Steinbach, et al., "The Challenges of Clustering High Dimensional Data", In Proceedings of New Vistas in Statistical Physics: Applications in Econophysics, Bioinformatics, and Pattern Recognition, Nov. 22, 2012, 33 pages.
Torralba, et al., "80 Million Tiny Images: A Large Data Set for Nonparametric Object and Scene Recognition", In Proceedings of IEEE Transactions on Pattern Analysis and Machine Intelligence, vol. 30, Issue 11, Nov. 2008, 12 pages.
Xiong, et al., "Spectral Active Clustering via Purification of the k-Nearest Neighbor Graph", In Proceedings of the European Conference on Data Mining, Jul. 21, 2012, 9 pages.
Yan, et al., "Pairwise Constrained Clustering for Sparse and High Dimensional Feature Spaces", In Proceedings of the 13th Pacific-Asia Conference on Advances in Knowledge Discovery and Data Mining, May 29, 2009, 8 pages.
Achanta, et al., "Frequency-tuned Salient Region Detection", <<http://www.cs.utoronto.ca/strider/publications/SaliencyCVPRO9.pdf>>, IEEE CVPR, 2009, 8 pages.
Alexe, et al., "What is an object?", CVPR, 2010, pp. 73-80.
Arya, et al., "Approximate Nearest Neighbor Queries in Fixed Dimensions", <<http://marmoset.cs.umd.edu/mount/Papers/soda93-ann.pdf, In SODA, 1993, 10 pages.
Avidan, et al., "Seam Carving for Content-Aware Image Resizing", <<http://users.soe.ucsc.edu/manazhao/files/seamcarving.pdf>>, 2007, 9 pages.
Belkin, et al., "Laplacian Eigenmaps for Dimensionality Reduction and Data Representation", <<http://192.5.53.208/~stefanko/Teaching/09CS446/Laplacian.pdf>>, Neural Computation, 15(6):1373-1396, 2003.
Bentley, "Multidimensional Binary Search Trees Used for Associative Searching", <<http://cgi.di.uoa.gr/ad/MDE515/p509-bentley.pdf>>, Communications of the ACM, vol. 18, No. 9, Sep. 1975, pp. 509-517.
Bentley, "Multidimensional Divide-and-Conquer", <<http://akira.ruc.dk/keld/teaching/algoritmedesign_f03/Artikler/12/Bentley80.pdf>>, Communications of the ACM, vol. 23, No. 4, Apr. 1980, pp. 214-229.
Bentley, et al., "The complexity of finding fixed-radius near neighbors", Information Processing Letters, vol. 6, No., 1977, pp. 209-212.
Bhattacharya, et al., "A Framework for Photo-Quality Assessment and Enhancement based on Visual Aesthetics", ACM Multimedia, pp. 271-280, 2010.
Borenstein, et al., "Shape Guided Object Segmentation", In Proceedings of the IEEE Computer Society Conference on Computer Vision and Pattern Recognition, vol. 1, Jun. 22, 2006, pp. 969-976.
Boykov, et al., "An Experimental Comparison of Min-Cut/Max-Flow Algorithms for Energy Minimization in Vision", In IEEE Transactions on PAMI, vol. 26, No. 9, pp. 1124-1137, Sep. 2004.
Boykov, et al. "Interactive Graph Cuts for Optimal Boundary & Region Segmentation of Objects in N-D Images" Proceedings of Internation Conference on Computer Vision, Vancouver, Canada, Jul. 2001, 8 pages.

Breiman, "Random Forests", <<http://hci.iwr.uni-heidelberg.de/MIP/Teaching/pr/09-ex06/RandomForests.pdf>>, Machine Learning, vol. 45, No. 1, 2001, pp. 5-32.
Chapelle, et al., "Semi-Supervised Classification by Low Density Separation", <<http://citeseer.ist.psu.edu/viewdoc/download;jsessionid=0DC3C1DF5A3212CC3C39B0D1578A6488?doi=10.1.1.59.6843&rep=rep1&type=pdf>>, Proceedings of the 10th International Workshop on Artificial Intelligence and Statistics (AISTAT), 2005, pp. 57-64.
Chen, et al., "Fast Approximate kNN Graph Construction for High Dimensional Data via Recursive Lanczos Bisection", <<http://www.mcs.anl.gov/jiechen/pub/divide_and_conquer_knn.pdf>>, Journal of Machine Learning Research, vol. 10, Sep. 2009, pp. 1989-2012.
Cheng et al., "Global Contrast based Salient Region Detection", <<http://cg.cs.tsinghua.edu.cn/people/cmm/saliency/ChengSaliencyCVPR2011S.pdf>>, IEEE CVPR, pp. 409-416, 2011.
Clarkson, "Fast Algorithms for the All Nearest Neighbors Problem", <<http://ieeexplore.ieee.org/stamp/stamp.jsp?tp=&arnumber=4568082>>, Proceedings of the 24th Annual Symposium on Foundations of Computer Science (FOCS), Nov. 1983, pp. 226-232.
Connor, et al., "Fast Construction of k-Nearest Neighbor Graphs for Point Clouds", <<http://ieeexplore.ieee.org/stamp/stamp.jsp?tp=&arnumber=5383353>>, IEEE Transactions on Visiualization and Computer Graphics, vol. 16, No. 4, Jul./Aug. 2010, pp. 599-608.
Dasgupta, et al., "Random projection trees and low dimensional manifolds", <<http://cseweb.ucsd.edu/dasgupta/papers/rptree-stoc.pdf>>, Proceedings of the 40th Annual ACM Symposium on Theory of Computing (STOC), May 2008, pp. 537-546.
Datar, et al., "Locality-Sensitive Hashing Scheme Based on p-Stable Distributions", <<http://citeseerx.ist.psu.edu/viewdoc/download?doi=10.1.1.134.8167&rep=rep1&type=pdf>>, Symposium on Computational Geometry (SOCG), 2004, pp. 253-262.
Datta, et al., "Studying Aesthetics in Photographic Images Using a Computational Approach", <<http://infolab.stanford.edu/wangz/project/imsearch/Aesthetics/ECCV06/datta.pdf>>, in ECCV, pp. 288-301, 2006.
Felzenszwalb, et al., "Distance Transforms of Sampled Functions", <<http://www.cs.cornell.edu/home/dph/papers/dt.pdf>>, Cornell Computing and Information Science TR2004-1963, 2004, 15 pages.
Felzenszwalb, et al., "Efficient Graph-Based Image Segmentation", <<http://pages.cs.wisc.edu/dyer/ai-qual/felzenszwalb-ijcv04.pdf, International Journal of Computer Vision, 59(2):167-181, 2004.
Friedman, et al., "An Algorithm for Finding Best Matches in Logarithmic Expected Time", <<http://www.dti.unimi.it/righini/Didattica/Algoritmi%20Euristici/MaterialeAE/k-d20trees.pdf>>, ACM Transactions on Mathemahcal Software, vol. 3, No. 3, Sep. 1977, pp. 209-226.
Ge, et al., "Image-Segmentation Evaluation From the Perspective of Salient Object Extraction", In Proceedings of the IEEE Computer Society Conference on Computer Vision and Pattern Recognition, Jun. 22, 2006, pp. 1146-1153.
Goferman, et al., "Context-Aware Saliency Detection", <<http://vc.cs.nthu.edu.tw/home/paper/codfiles/yhlee/201010290434/context-aware20saliency20detection.pdf>>, CVPR, pp. 2376-2383. IEEE, 2010.
Hacid, et al., "Incremental Neighborhood Graphs Construction for Multidimensional Databases Indexing", Proceedings of the 20th conference of the Canadian Society for Computational Studies of Intelligence on Advances in Artificial Intelligence (CAI), 2007, pp. 405-416.
Hou, et al., "Saliency Detection: A Spectral Residual Approach", <<http://www.klab.caltech.edu/xhou/papers/cvpr07.pdf>>, CVPR, 2007, 8 pages.
Itti, et al., "A Model of Saliency-Based Visual Attention for Rapid Scene Analysis", <<http://cseweb.ucsd.edu/classes/fa09/cse258a/papers/itti-koch-1998.pdf>>, IEEE Trans. Pattern Anal. Mach. Intell., 1254-1259, Nov. 1998.
Kolmogorov, "What Energy Functions Can Be Minimized via Graph Cuts?", IEEE Transactions on Pattern Analysis and Machine Intelligence, vol. 26, No. 2, Feb. 2004, 13 pages.
Kovesi, "MATLAB and Octave functions for computer vision and image processing", Centre for Exploration Targeting, School of Earth

(56) References Cited

OTHER PUBLICATIONS and Environment, The University of Western Australia. Available from: <<http://www.csse.uwa.edu.au/pk/research/matlabfns/>>, retrieved on Apr. 19, 2012, 16 pages.

Kulis, "Kernelized Locality-Sensitive Hashing for Scalable Image Search", <<http://www.eecs.berkeley.edu/kulis/pubs/iccv_klsh.pdf>>, Computer Vision, 2009 IEEE 12th International Conference, Oct. 2009, 8 pages.

Kumar, et al., "What Is a Good Nearest Neighbors Algorithm for Finding Similar Patches in Images?"<<http://www.cs.washington.edu/homes/neeraj/publications/base/papers/nk_eccv2008_nnsearch.pdf>>, ECCV '08 Proceedings of the 10th European Conference on Computer Vision: Part II, 2008, 15 pages.

Lanczos, "An Iteration Method for the Solution of the Eigenvalue Problem of Linear Differential and Integral Operators", <<http://x86.cs.duke.edu/courses/fall06/cps258/references/Krylov-space/Lanczos-original.pdf>>, Journal of Research of the National Bureau of Standards, vol. 45, No. 4, Oct. 1950, pp. 255-282.

Li, et al., "Lazy Snapping", <<http://uirvli.ai.uiuc.edu/tankh/citations/sketch_selection_iccv2001/li_siggraph2004.pdf>>, ACM Trans. Graph., 23(3): 303-308, 2004.

Liu, et al., "Learning to Detect a Salient Object", IEEE Transactions on Ptter Anazlysis and Machine Intelligence, vol. 33, No. 2, Feb. 2011, 15 pages.

Liu, et al., "An Investigation of Practical Approximate Nearest Neighbor Algorithms", <<http://www.autonlab.org/autonweb/14714/version/4/part/5/data/liu-nips04.pdf?branch=main&language=en>>, Proceedings of 17th Advances in Neural Information Processing Systems (NIPS), 2004, pp. 825-832.

Liu, et al., "Learning to Detect a Salient Object", Computer Vision and Pattern Recognition, IEEE Computer Society Conference, 2007, 8 pages.

Liu, et al., "Region Enhanced Scale-invariant Saliency Detection", <<http://www.cecs.uci.edu/papers/icme06/pdfs/0001477.pdf>>, ICME, pp. 1477-1480, 2006.

Luo, et al., "Photo and Video Quality Evaluation: Focusing on the Subject", <<http://137.189.35.203/WebUI/PhotoQualityEvaluation/downloads/eccv08_Photo%20and%20Video%20Quality%20Evaluation.pdf>>, In ECCV, Part III, pp. 386-399, 2008.

Mahamud, et al., "Segmentation of Multiple Salient Closed Contours from Real Images", In Proceedings of the IEEE Transactions on Pattern Analysis and Machine Intelligence, vol. 25, No. 4, Apr. 2003, pp. 433-444.

Maier, et al., "Cluster Identification in Nearest-Neighbor Graphs", <<http://www.informatik.uni-hamburg.de/ML/contents/people/luxburg/publications/MaiHeiLux07_TR.pdf>>, Proceedings of the 18th International Confererence on Algorithmic Learning Theory (ALT), May 2007, pp. 196-210.

Martin, et al., "Learning to Detect Natural Image Boundaries Using Local Brightness, Color, and Texture Cues", <<http://www.cs.princeton.edu/courses/archive/fall09/cos429/papers/martin_et_al.pdf>>, Submitted to IEEE Transactions on Pattern Analysis and Machine Intelligence, 2004, 20 pages.

Paredes, et al., "Practical construction of k-nearest neighbor graphs in metric spaces", WEA, 2006, pp. 85-97.

Rother, et al., ""GrabCut"—Interactive Foreground Extraction using Iterated Graph Cuts", <<https://mywebspace.wisc.edu/pwang6/personal/siggraph04.pdf>>, ACM Transactions on Graphics, 2004, 6 pages.

Roweis, et al., "Nonlinear Dimensionality Reduction by Locally Linear Embedding", <<http://www.csie.ntu.edu.tw/~mhyang/course/u0030/papers/Roweis%20Saul%20Science.pdf>>, Science, vol. 290, Dec. 2000, pp. 2323-2326.

Rutishauser, et al., "Is bottom-up attention useful for object recognition?", <<http://www.klab.caltech.edu/refweb/paper/477.pdf>>, In IEEE Conference on Computer Vision and Pattern Recognition , 2004, 8 pages.

Sebastian, et al., "Metric-based Shape Retrieval in Large Databases", <<http://www.lems.brown.edu/vision/publications/ICPR02.pdf>>, Proceedings of the 16th International Conference on Pattern Recognition (ICPR), vol. 3, 2002, pp. 291-296.

Silpa-Anan, et al., "Optimised KD-trees for fast image descriptor matching", <<http://mplab.ucsd.edu/wp-content/uploads/CVPR2008/Conference/data/papers/298.pdf>>, IEEE Conference on Computer Vision and Pattern Recognition (CVPR), Jun. 2008, 8 pages.

Stahl, et al., "Edge Grouping Combining Boundary and Region Information", IEEE Transactions on Image Processing, vol. 16, No. 10, Oct. 2007, 17 pages.

Tenenbaum, et al., "Global Geometric Framework for Nonlinear Dimensionality Reduction", <<http://iie.fing.edu.uy/investigacion/grupos/gti/cursos/sapiro_2007/material/documentos/sci_reprint.pdf>> Science, vol. 290, Dec. 2000, pp. 2319-2323.

Uno, et al., "Efficient Construction of Neighborhood Graphs by the Multiple Sorting Method", <<http://arxiv.org/pdf/0904.3151v1>> CORR, Apr. 2009, 15 pages.

Vaidya, "An O(n log n) algorithm for the all-nearest-neighbors problem", Journal of Discrete & Computational Geometry, vol. 4, No. 2, Jan. 1989, pp. 101-115.

Veksler, "Star Shape Prior for Graph-Cut Image Segmentation", <<http://www.csd.uwo.ca/faculty/olga/Papers/eccv2008Final.pdf>>, In Proceedings of the 10th European Conference on Computer Vision: Part III, ECCV '08, Berlin, Heidelberg, 2008. Springer-Verlag. ISBN 978-3-540-88689-1, 15 pages.

Verma, et al., "Which Spatial Partition Trees are Adaptive to Intrinsic Dimension?", <<http://uai2009.cs.mcgill.ca/papers/UAI2009_0226_79d59e9d41b3730af2ceed69aa130243.pdf>>, Proceedings of the 25th Conference on Uncertainty in Artificial Intelligence (UAI), 2009, pp. 565-574.

Vicente, et al., "Graph cut based image segmentation with connectivity priors", <<http://research.microsoft.com/pubs/80485/CVPR08-ConnectedGC.pdf>>, Computer Vision and Pattern Recognition, IEEE Computer Society Conference, 2008, 8 pages.

Virmajoki, et al., "Divide-and-conquer Algorithm for Creating Neighborhood Graph for Clustering", <<http://ieeexplore.ieee.org/stamp/stamp.jsp?tp=&arnumber=1334103>>, Proceedings of the 17th International Conference on Pattern Recognition (ICPR), vol. 1, 2004, 4 pages.

Wang, et al., "Picture Collage", <<http://mmlab.ie.cuhk.edu.hk/2006/01640779.pdf>>, In Proceedings of CVPR 06, 2006, 8 pages.

Wang, et al., "Salient Closed Boundary Extraction with Ratio Contour", <<http://citeseerx.ist.psu.edu/viewdoc/summary?doi=10.1.1.58.9592>>, IEEE Transactions on Pattern Analysis and Machine Intelligence, vol. 27, No. 4, Apr. 2005, 16 pages.

Xue, et al., "Proto-Object Based Rate Control for JPEG2000: An Approach to Content-Based Scalability" IEEE Transactions on Image Processing, vol. 20, No. 4, Apr. 2011, 8 pages.

Yianilos, "Data Structures and Algorithms for Nearest Neighbor Search in General Metric Spaces", <<http://citeseerx.ist.psu.edu/viewdoc/download?doi=10.1.1.41.4193&rep=rep1&type=pdf>>, Proceedings of the 4thh annual ACM-SIAM Symposium on Discrete algorithms (SODA), 1993, pp. 311-321.

Zhang, et al., "Free-Shape Subwindow Search for Object Localization", <<http://130.203.133.150/viewdoc/summary?doi=10.1.1.163.85>>, In CVPR, 2010, 8 pages.

Zhou, et al., "Ranking on Data Manifolds", <<http://citeseerx.ist.psu.edu/viewdoc/download?doi=10.1.1.67.7846&rep=rep1&type=pdf>>, Proceedings of 16th Advances in Neural Information Processing Systems (NIPS), 2003, 8 pages.

Zhu, "Semi-supervised Learning Literature Survey", <<http://citeseer.ist.psu.edu/viewdoc/download?doi=10.1.1.103.1693&rep=rep1&type=pdf>>, Computer Sciences Technical Report 1530, University of Wisconsin, Madison, 2007, 52 pages.

Chen, et al., "Fast Approximate kNN Graph Construction for High Dimensional Data via Recursive Lanczos Bisection", University of Minnesota, Oct. 2, 2008, pp. 1-20.

Office action for U.S. Appl. No. 13/411,213, mailed on Nov. 6, 2013, Wang, et al., "Image Searching by Approximate k-NN Graph", 11 pages.

Office Action for U.S. Appl. No. 13/794,427, mailed on Aug. 14, 2014, Wang et al., "Salient Object Detection in Images via Saliency", 10 pages.

* cited by examiner

SALIENT OBJECT SEGMENTATION

BACKGROUND

Individuals will recognize an object of interest located in an image, which may be referred to as a main focus of attention for a typical viewer (or a "salient object"). A salient object may be defined as an object being prominent or noticeable. For instance, individuals may identify a salient object in visual images, such as in a photograph, a picture collage, a video, or the like.

Recently, computational models have been created to identify a salient object in an image. These computational models may rely on various methods using computer systems to identify a salient object within an image. One of the computational models computes a saliency value for each pixel based on color and orientation information using "center-surround" operations, akin to visual receptive fields. Another computational model relies on a conditional random fields (CRF) framework to separate a salient object from a background of an image. In yet another example, another computational model defines saliency with respect to all of the regions in the image.

SUMMARY

This disclosure describes identifying a salient object in an image with respect to its context. In one aspect, a process receives an input image that includes a salient object. The process segments the input image into multiple regions and calculates a saliency value for each of the segmented regions based on scale image levels. The process constructs saliency maps based at least in part on the calculated saliency value, and combines the saliency maps to construct a total saliency map. Next, the process connects a set of line segments computed from the input image and utilizes the total saliency map to define a shape prior that has a defined boundary.

In another aspect, the process further segments the salient object by minimizing an energy function of a set of labels assigned to each pixel in the input image. The process updates appearance and shape based on the salient object in a last iteration. The process may search for images similar in appearance and shape to the salient object in the input image.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The Detailed Description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

Figure 1:
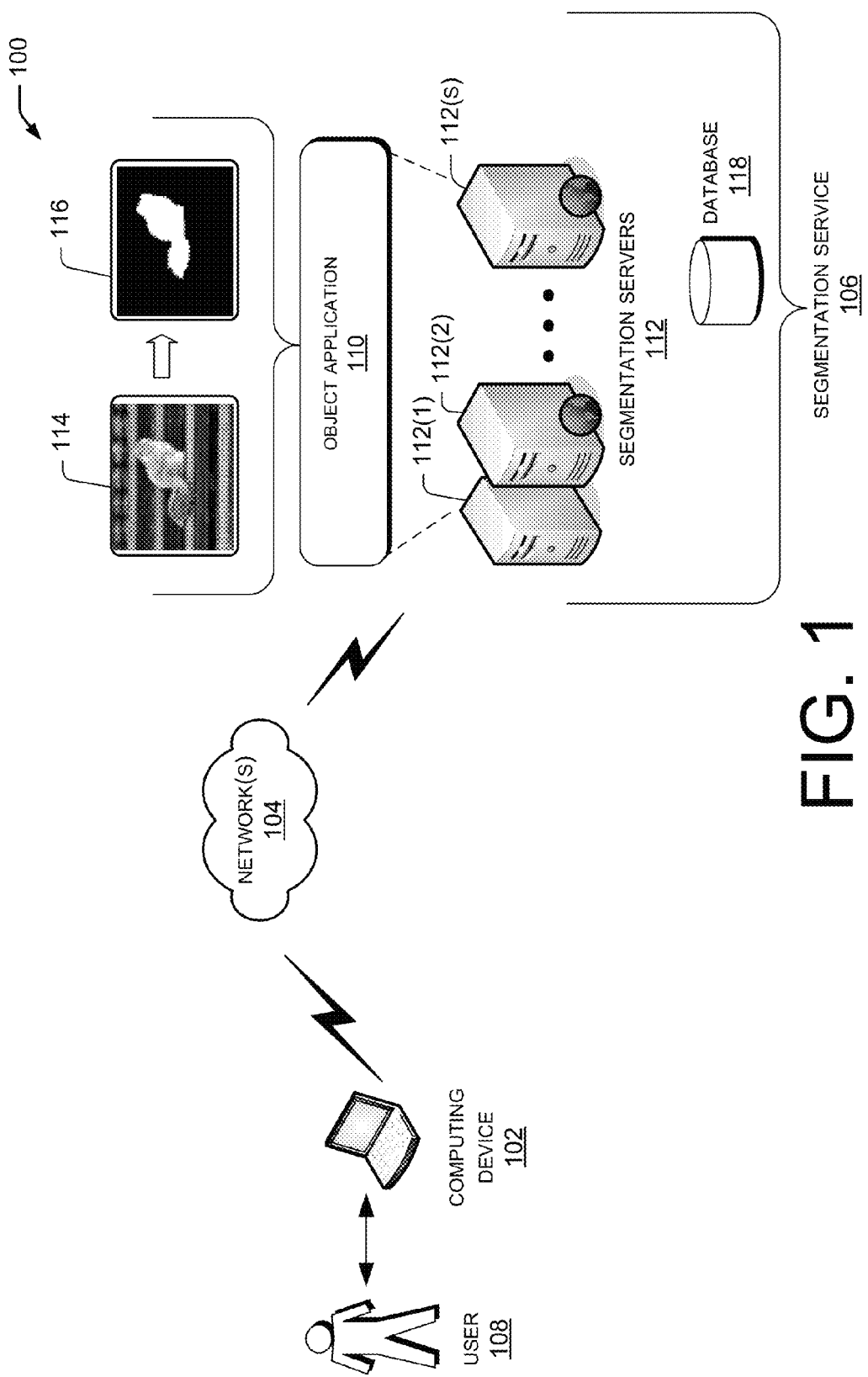
FIG. 1 illustrates an architecture to support an example environment to identify and to segment a salient object from an input image.

This disclosure describes identifying a salient object located in an input image by performing a series of processes on the input image, and then segmenting the salient object from the input image. The disclosure further describes using the segmented object in various applications, such as image searches, image diagnoses/analyses, image verifications, and the like.

For example, envision that an individual takes a photograph of vehicle "A" parked along a street, in which vehicle "A" is centered in the photograph along with other vehicles parked parallel on the street. The individual, desiring more information about vehicle "A," then submits the photograph as an input image to a search engine. The search engine relies on a process described below to identify vehicle "A" as the salient object and to segment vehicle "A" from the image. The process also refines an appearance and a shape of vehicle "A" to provide a more accurate representation of the vehicle. The process performs searches (on the World Wide Web, databases, directories, servers, etc.) based at least in part on the segmented and refined salient object for the purpose of identifying search results that are based on this image of vehicle "A." The process accordingly returns search results that are similar in appearance and shape to the segmented salient object. As such, the individual is able to learn information associated with vehicle "A" in response to taking the picture of this vehicle and providing this image to a search engine.

In yet other examples, the segmented salient object may be used in a variety of other applications such as medical analysis, medical diagnosis, facial recognition, object recognition, fingerprint recognition, criminal investigation, and the like.

In order to identify a salient object within an image, such as vehicle "A" in the example above, this disclosure describes a process for identifying salient objects based on an intermediate context associated with the image rather than simply searching all regions of the image. The process determines that the salient object in the input image tends to have several characteristics, such as being different in appearance from its neighboring regions in the input image, being located near a center of the input image, and having a well-defined closed boundary.

To identify the salient object in an input image, the process fragments the input image into multiple regions. Each of the multiple regions in the input image is distinguished from a neighboring region based at least in part on that a higher saliency value computed for a region as the region is better distinguished from its immediate context. The immediate context being defined as immediate neighboring regions of the region. A high saliency value is often computed for the region near the center of the image. Spatial neighbors are two regions that share a common boundary. The propagating of the saliency value from the regions to the pixels create a full-resolution saliency map.

The process further connects a set of line segments obtained from the input image. However, there may be gaps present between each set of line segments. Therefore, the process adds gap-filling segments to fill in the gaps by combining the saliency map to form a closed contour that is expected around the salient object. The closed contour results in a shape prior. Thereafter, the process surrounds the salient object with the closed contour to result in the shape prior. The shape prior provides a cue towards segmenting the salient object.

Segmenting refers to a process of partitioning the image into multiple segments, commonly referred to as superpixels, also known as a set of pixels. Here, the process further segments the salient object to simplify a representation of the image for use in various applications. The process performs "salient object segmentation" by solving for energy minimization of assigned set of labels to each pixel in the input image. The energy minimization is based at least in part on the input image received, the saliency map constructed, and the shape prior extracted from the input image and the total saliency map. After the salient object segmentation, the process further optimizes the salient object segmentation by performing an iterative energy minimization until there is convergence. This convergence refines an appearance and a shape of the segmented salient object. In other words, the process updates the appearance and the shape based on the segmented salient object in the last iteration. Then the process applies the updated appearance and shape to update the energy function. For instance, the segmented salient object represents the object more accurately to use in searching for objects that are similar to the segmented salient object. Thus, the searching may be performed quickly and easily in image type applications, evaluations, diagnoses, and the like.

While aspects of described techniques can be implemented in any number of different computing systems, environments, and/or configurations, implementations are described in the context of the following example computing environment.

Illustrative Environment

FIG. 1 illustrates an example architectural environment 100, in which identifying and extracting the salient object from the input image may be performed on a computing device. The environment 100 includes an example computing device 102, which is illustrated as a laptop computer. The computing device 102 is configured to connect via one or more network(s) 104 to access a segmentation service 106 for a user 108. It is noted that the computing device 102 may take a variety of forms, including, but not limited to, a portable handheld computing device (e.g., a personal digital assistant, a smart phone, a cellular phone), a tablet, a personal navigation device, a desktop computer, a portable media player, or any other device capable of connecting to one or more network(s) 104 to access the segmentation service 106 for the user 108.

The computing device 102 may have additional features and/or functionality. For example, the computing device 102 may also include additional data storage devices (removable and/or non-removable) such as, for example, magnetic disks, optical disks, or tape. Such additional storage may include removable storage and/or non-removable storage. Computer-readable media may include, at least, two types of computer-readable media, namely computer storage media and communication media. Computer storage media may include volatile and non-volatile, removable, and non-removable media implemented in any method or technology for storage of information, such as computer readable instructions, data structures, program modules, or other data. A system memory, the removable storage and the non-removable storage are all examples of computer storage media. Computer storage media includes, but is not limited to, RAM, ROM, EEPROM, flash memory or other memory technology, CD-ROM, digital versatile disks (DVD), or other optical storage, magnetic cassettes, magnetic tape, magnetic disk storage or other magnetic storage devices, or any other non-transmission medium that can be used to store the desired information and which can be accessed by the computing device 102. Any such computer storage media may be part of the computing device 102. Moreover, the computer-readable media may include computer-executable instructions that, when executed by the processor(s), perform various functions and/or operations described herein.

In contrast, communication media may embody computer-readable instructions, data structures, program modules, or other data in a modulated data signal, such as a carrier wave, or other transmission mechanism. As defined herein, computer storage media does not include communication media.

The network(s) 104 represents any type of communications network(s), including wire-based networks (e.g., cable), wireless networks (e.g., cellular, satellite), cellular telecommunications network(s), WiFi networks, and IP-based telecommunications network(s). The segmentation service 106 represents a service that may be operated as part of any number of online service providers, such as a search engine, or for applications such as object recognition, medical image, and the like.

The segmentation service 106 may operate in conjunction with an object application 110 that executes on one or more of the segmentation servers 112(1)-(S). The object application 110 performs the processes described, such as receiving an input image, creating saliency maps, forming a shape prior from the input image creating a total saliency map, minimizing energy when segmenting the salient object from the saliency map, and segmenting the salient object. For instance, the object application 110 receives an input image 114 illustrating a squirrel sitting on a fence rail with the fence rails as a background image. Here, the squirrel is the salient object in the input image 114. The object application 110 performs various techniques of the input image 114 to be discussed in details with references to FIGS. 2-10. Based on the various techniques to be performed, an output image 116 represents the segmented salient object. Here the squirrel is shown only, without any background image. The segmented salient object has a defined shape, which helps the search process in accuracy and efficiency.

In the illustrated example, the segmentation service 106 is hosted on one or more servers, such as segmentation server(s) 112(1), 112(2), . . . , 112(S), accessible via the network(s) 104. The segmentation servers 112(1)-(S) may be configured as plural independent servers, or as a collection of servers that are configured to perform larger scale functions accessible by the network(s) 104. The segmentation server(s) 112 may be administered or hosted by a network service provider that provides the segmentation service 106 to and from the computing device 102.

A database 118 may be a separate server or may be a representative set of server 112 that is accessible via the network(s) 104. The database 118 may store information, such as algorithms or equations to perform the processes for identifying and segmenting the salient object, images, models, and the like.

FIGS. 2, 3, 6, and 9 illustrate flowcharts showing example processes. The processes are illustrated as a collection of blocks in logical flowcharts, which represent a sequence of operations that can be implemented in hardware, software, or a combination. For discussion purposes, the processes are described with reference to the computing environment 100 shown in FIG. 1. However, the processes may be performed using different environments and devices. Moreover, the environments and devices described herein may be used to perform different processes.

For ease of understanding, the methods are delineated as separate steps represented as independent blocks in the figures. However, these separately delineated steps should not be construed as necessarily order dependent in their performance. The order in which the process is described is not intended to be construed as a limitation, and any number of the described process blocks maybe combined in any order to implement the method, or an alternate method. Moreover, it is also possible for one or more of the provided steps to be omitted.

Figure 2:
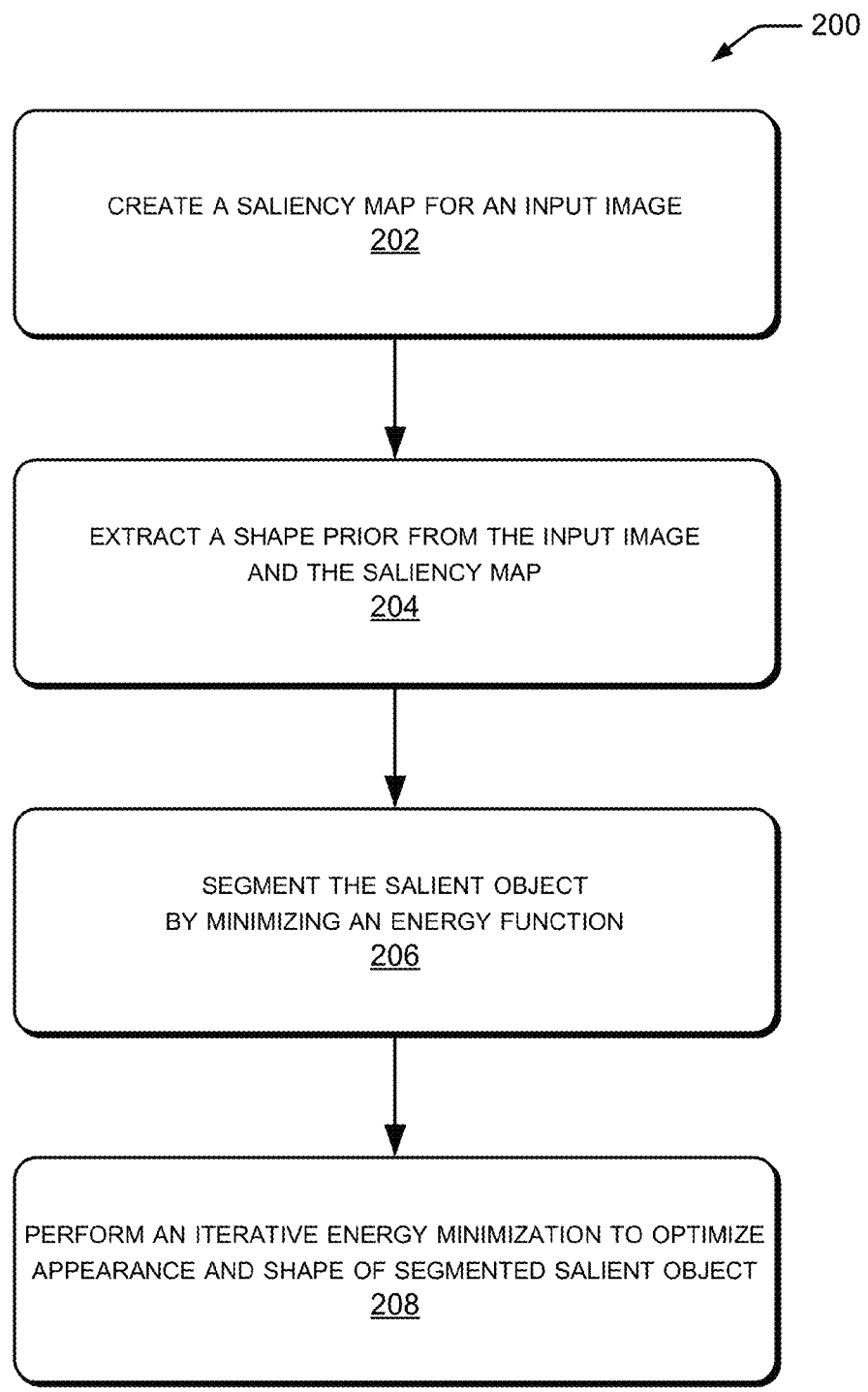
FIG. 2 is a flowchart to illustrate example phases at a high level to be used in the architecture of FIG. 1.

FIG. 2 is a flowchart of an example process 200 showing high-level functions performed by the object application 110. The object application 110 provides a segmented salient object to be used in image searches, medical analysis or diagnosis, object or facial recognitions, criminal investigations, and the like. The process 200 may be divided into four phases, an initial phase 202 to create a saliency map for an input image, a second phase 204 to extract a shape prior from the input image and the saliency map, a third phase 206 to segment the salient object by minimizing energy, and a fourth phase 208 to perform an iterative energy minimization to optimize an appearance and a shape of the segmented salient object. All of the phases may be used in the environment of FIG. 1, may be performed separately or in combination, and without any particular order.

The first phase 202 is to create the saliency map for an input image. For instance, the object application 110 receives input images 114 including but not limited to digital images of people, places, or things with foregrounds and backgrounds, photographs, medical images, fingerprint images, facial features, and the like. The object application 110 receives the input image that includes the salient object. The object application 110 also fragments the input image 114 into multiple regions in order to create the saliency map, which is a full-resolution map of the salient object in a region and neighboring regions.

The second phase 204 is to extract a shape prior from the input image and the saliency map. For example, the object application 110 receives the full-resolution saliency map, further connects a set of line segments obtained from the input image by utilizing the saliency maps. The object application 110 basically creates a boundary that is expected to be around the salient object. Also, the object application 110 fills in any gaps to construct a closed boundary around the salient object.

The third phase 206 is to segment the salient object by minimizing an energy function. For instance, the object application 110 segments the salient object by solving for energy minimization for a set of labels assigned to each pixel in the input image. The third phase 206 combines bottom-up saliency information and extracted shape prior information in a framework.

The fourth phase 208 is to perform an iterative energy minimization to optimize an appearance and a shape of the segmented salient object. Details are discussed for identifying the salient object and creating the saliency map with reference to FIGS. 3-5; for extracting the shape prior with reference to FIGS. 6-8, and for segmenting the salient object with reference to FIGS. 9-10. Details of the functions of the server are discussed with reference to FIG. 11.

Creating a Saliency Map for an Input Image

Figure 3:
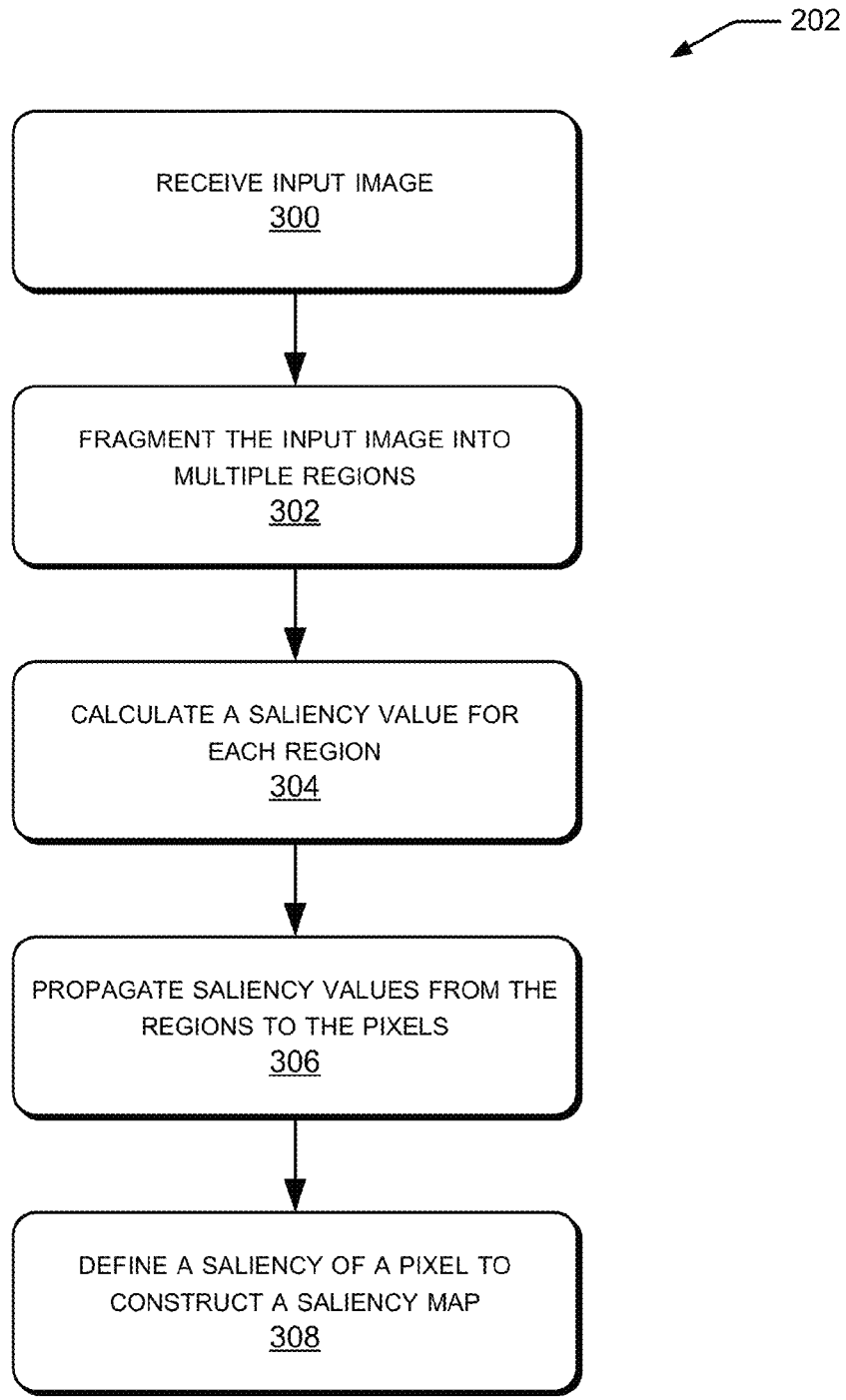
FIG. 3 is a flowchart to illustrate an example process of creating a saliency map.

FIG. 3 is a flowchart illustrating an example process for phase 202 (discussed at a high level above) of creating the saliency map. As discussed previously, the salient object in the input image 114 tends to be distinguished from its intermediate context of spatial neighbors. For instance, the salient object tends to have a higher saliency value than the neighboring regions.

At 300, the object application 110 receives the input image 114 from a collection of photographs, from various applications such as a photograph sharing website, a social network, a search engine, and the like. The input image 114 may include but is not limited to, digital images of people, places or things, medical images, fingerprint images, video content, and the like. The input image may take many forms, such as video sequences, views from multiple cameras, or multi-dimensional data from a medical scanner.

At 302, the object application 110 fragments the input image 114 into multiple regions represented by $\{r_i^{(n)}\}_{i=1}^{R(n)}$. As a result of the fragmented image, the object application 110 calculates a saliency value for each region 304. The multiple regions contain parts that appear at different scales in the image.

For instance, the object application 110 computes the saliency value on a region level based on a number of superpixels at multiple scales, which may be significantly less than a number of pixels in the input image 114. By using the multiple superpixel scales, the object application 110 performs fewer computations, which is more efficient in processing than computing with the number of pixels. The object application 110 may fragment the input image 114 into the multiple regions based on N groups of superpixels having different parameters.

The object application 110 calculates the saliency value for each region 304 by using the following equation:

$$S(r_i^{(n)}) = -w_i^{(n)} \log(1 - \Sigma_{k=1}^{K(n)} \alpha_{ik}^{(n)} d_{color}(r_i^{(n)}, r_k^{(n)})) \quad \text{Equation (1)}$$

where $r_i^{(n)}$ represents a region, $\{r_k^{(n)}\}_{k=1}^{K(n)}$ represents the spatial neighbors, and $\alpha_{ik}^{(n)}$ represents a ratio between an area of $r_k^{(n)}$ and a total area of the spatial neighbors $r_i^{(n)}$. Furthermore, $d_{color}(r_i^{(n)}, r_k^{(n)})$ represents a color distance between regions $r_i^{(n)}$ and $r_k^{(n)}$, which is defined as the $X^2$ distance between International Commission on Illumination (CIE) L*, a*, b* color space and hue histograms of the two regions. CIE is an authority on light, illumination, color, and color spaces. The dimension L represents lightness, while a and b represent the color-opponent dimensions. In an implementation, the object application 110 may assign a set of labels to each label pixel. Thus, the object application 110 calculates a saliency with respect to superpixels at multiple scales, where an index of a scale is represented by a small letter n. The superpixels at different scales pertain to the scale of context in making the saliency computation more robust in various environments and in achieving better performance than other techniques. For instance, the other techniques typically assume the scale of context is fixed and is learned from training data.

The object application 110 further applies a Gaussian falloff weight to the saliency values of the regions. The Gaussian falloff weight may be computed from spatial positions of the regions. The Gaussian falloff weight is represented by $w_i^{(n)}$, which may be defined as $w_i^{(n)} = \exp(-9(dx_i^{(n)})^2/w^2 - (9(dy_i^{(n)})^2/h^2$ where width is represented by w and height represented by h. The variables $(dx_i^{(n)}, dy_i^{(n)})$ represent an average spatial distance of all pixels in $r_i^{(n)}$ to an image center.

At 306, the object application 110 propagates the saliency values from the multiple regions to the pixels. At 308, the object application 110 further defines a saliency of a pixel $S_m(p)$, based on the following equation:

$$S_m(p) = \frac{\sum_{n=1}^{N} \sum_{i=1}^{R(n)} S(r_i^{(n)})(\|I_p - c_i^{(n)}\| + \varepsilon)^{-1} \delta(p \in r_i^{(n)})}{\sum_{n=1}^{N} \sum_{i=1}^{R(n)} (\|I_p - c_i^{(n)}\| + \varepsilon)^{-1} \delta(p \in r_i^{(n)})} \quad \text{Equation (2)}$$

where I represents an input image, p represents a pixel, i represents an index of a region, n represents an index of superpixel scale, E represents a small constant, $c_i^{(n)}$ represents a color center of region $r_i^{(n)}$, $\|I_p - c_i^{(n)}\|$ represents a color distance from the pixel p to the color center of region $r_i^{(n)}$, and $\delta()$ represents an indicator function. In an implementation, $\epsilon$ may be equal to 0.1. The object application 110 may create computational models based on the processes described above and on the processes to be discussed with reference to FIGS. 4-10.

The object application 110 computes the saliency value for each region 304 based on equation (1), applies a Gaussian falloff weight based on the equation shown above to the saliency values of the regions, and constructs saliency maps for the different scales. Next, the object application 110 combines the saliency maps for the different scales to define a saliency value for each pixel based on equation (2).

Figure 4:
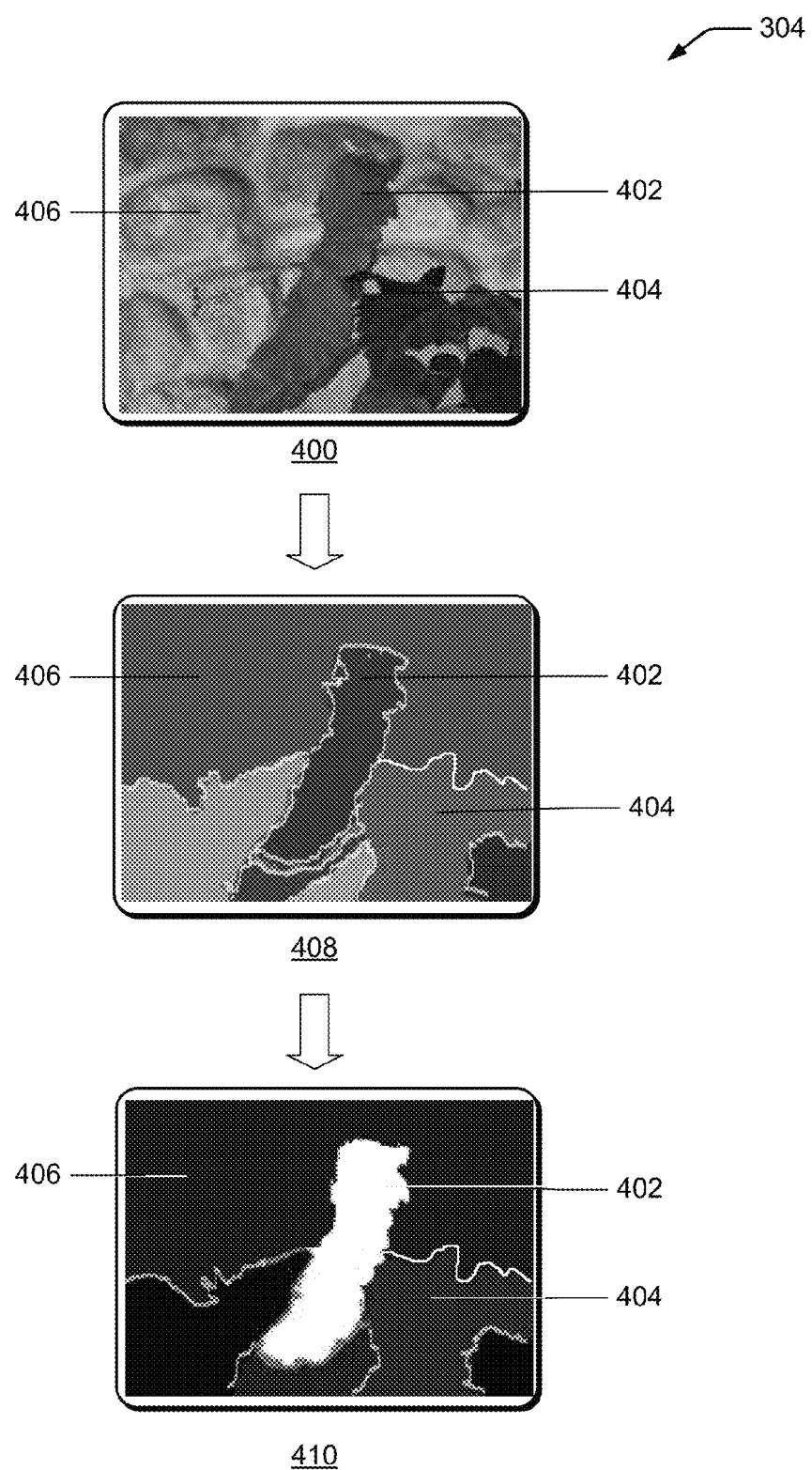
FIG. 4 illustrates an example process to identify a saliency of a region.

FIG. 4 illustrates an example process to calculate the saliency value for each region 304. Shown is an input image 400 of a flower 402 with a leaf 404 captured against a rock wall 406 as background. At 408, the object application 110 constructs the saliency map by fragmenting the input image 400 into the multiple regions. For instance, 402 illustrates a region of the flower, 404 illustrates a region of the leaf, and 406 illustrates a region of the rock wall. At 408, the object application 110 calculates a saliency value for each region based on equation (1) for multiple scale segmentation. For example, the object application 110 calculates the saliency values for the flower 402, the leaf 404, and the rock wall 406 by applying equation (1) as described above. From the calculations, the flower 402 has a higher saliency value than the leaf 404 and the rock wall 406. Each saliency value is further weighted by the Gaussian falloff weight. Then the object application 110 combines the saliency maps of the different scales. At 410, the flower 402 is the salient object as shown in the image.

Figure 5:
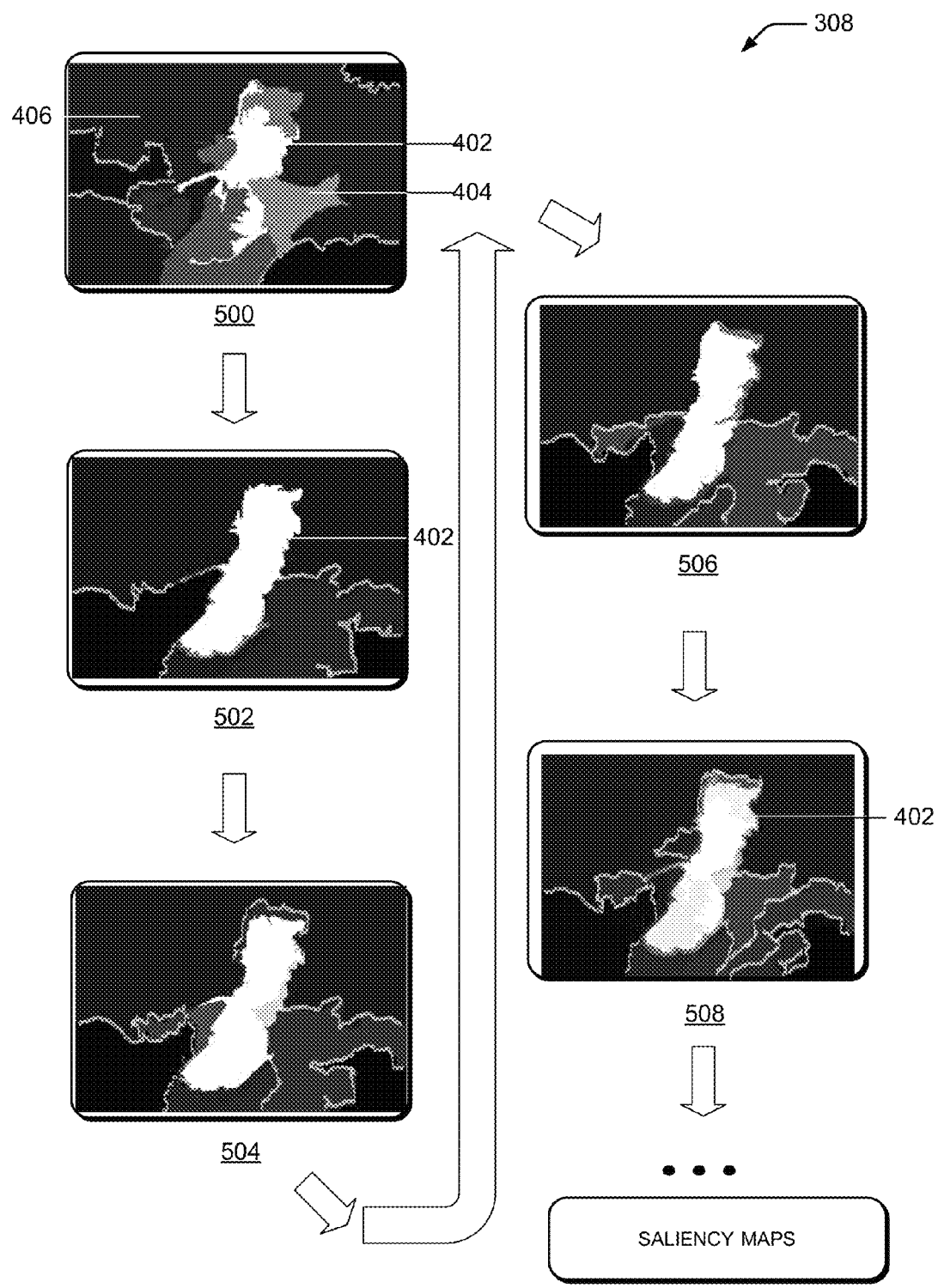
FIG. 5 illustrates an example process to define a saliency of a pixel.

FIG. 5 illustrates an example process to define the saliency of the pixel 308. Shown at 500, the object application 110 fragments the input image 114 of the flower 402, the leaf 404, and the rock wall 406 into the multiple regions to construct the saliency maps of the different scales to determine the saliency value for each pixel. At 502, the object application 110 segments the flower 402, the leaf 404, and the rock wall 406 at a first image scale level to create a first saliency map 504.

At 506, the object application 110 further segments the flower 402, the leaf 404, and the rock wall 406 at a second image scale level to create a second saliency map 508. Additional segmentations may occur to create other saliency maps at various image scale levels. In an implementation, the object application 110 further segments the flower 402, the leaf 404, and the rock wall 406 at a third image scale level to create a third saliency map. Then the object application 110 combines the first saliency map 504, the second saliency map 508, and a third saliency map to create a total saliency map. Any number of saliency maps may be computed based on the different image scale levels.

FIG. 5 illustrates the saliency of the pixel, computed from equation (2) as described above. The saliency of the pixel incorporates a color center of the region and a color distance from the pixel to the color center for salient object, the flower 402. Thus, the object application 110 creates a full-resolution saliency map from the input image 114.

Extracting a Shape Prior from the Input Image and Saliency Map

Figure 6:
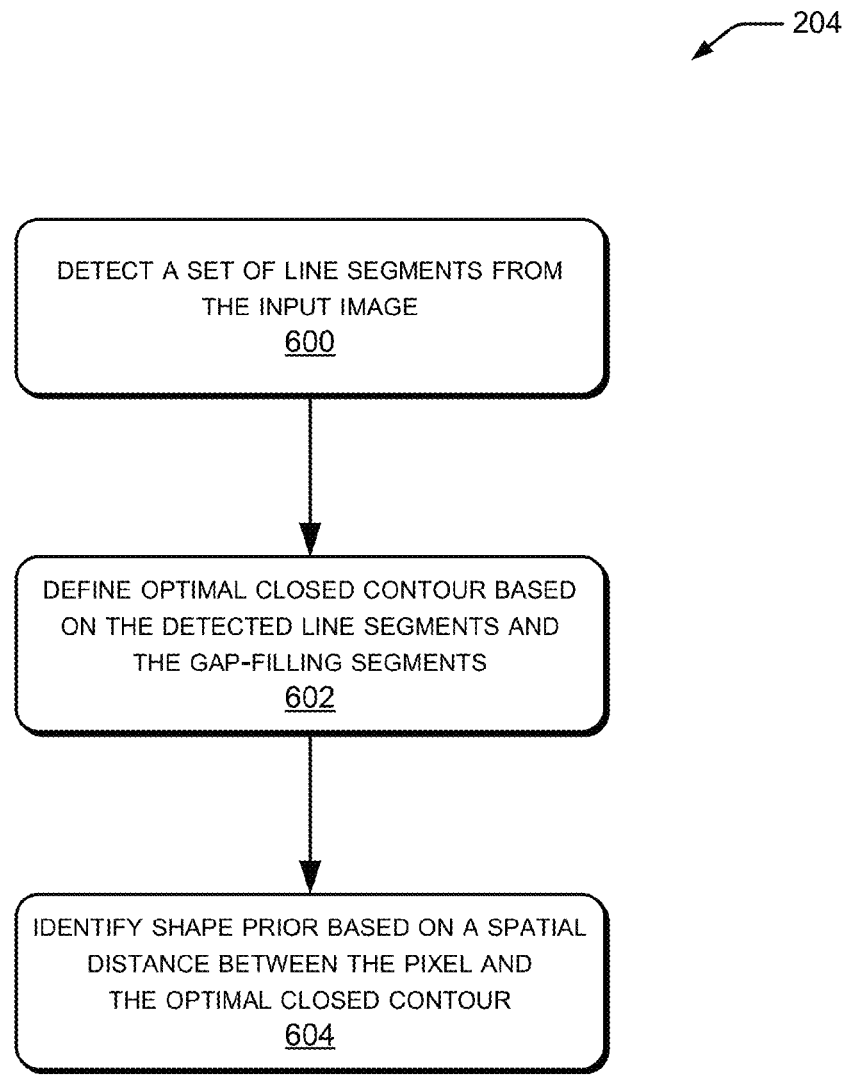
FIG. 6 a flowchart to illustrate an example process of extracting a shape prior from the input image and the saliency map.

FIG. 6 a flowchart to illustrate an example process for phase 204 (discussed at high level above) of extracting the shape prior from the input image and saliency map. At 600, the object application 110 detects a set of line segments from the input image. The object application 110 constructs a defined boundary that is expected to be around the salient object to create the shape prior. In an implementation, the object application 110 may use an edge detector followed by a line-fitting step. The object application 110 identifies the detected segments from the straight line segments described in 600. However, the detected segments tend to be disjointed with gaps present in the edge map. In some instances, the detected segments may be from noise or texture of the objects and background.

The object application 110 adds more line segments to fill the gaps between the detected segments. The object application 110 performs the process by adding gap-filling segments between each possible pair of endpoints of the multiple detected segments to form a closed contour of the salient object.

At 602, the object application 110 defines an optimal closed contour based on the detected segments. The closed contour is a cycle that traverses a set of detected segments and gap-filling segments alternately, to be added when optimizing equation (3). The object application 110 defines the optimal closed contour as a total length of gaps along the closed contour and a total saliency value of pixels inside the closed contour.

The line segments may be added and the optimal closed contour C* may be defined using the following equation:

$$C^* = \operatorname{argmin}_C \frac{|C_G|}{\sum_{p \in C} S_m(p)} \quad \text{Equation (3)}$$

where $|C_G|$ represents a total length of gaps along a contour C and $\sum_{p \in C} S_m(p)$ represents a total saliency value of pixels located inside the closed contour. The object application 110 may use a ratio contour algorithm to find an optimal cycle in polynomial time.

At 604, the object application 110 identifies the shape prior based on a spatial distance between the pixel and the optimal closed contour. The object application 110 uses the following equation to identify the shape prior $S_p$:

$$S_p(p) = 1 - \exp(1 - \gamma d(p)) \quad \text{Equation (4)}$$

where d(p) represents a spatial distance between pixel p and the optimal closed contour C* that may be computed using a distance transform, which is a derived representation of a digital image. Another variable, $\gamma$ represents a confidence of the shape prior. In an implementation, $\gamma$ may be set to 1 in equation (4). Based on the computation, the optimal closed contour C* may be a polygon shape, which may include but is not limited to a flat shape being joined by straight lines.

Figure 7:
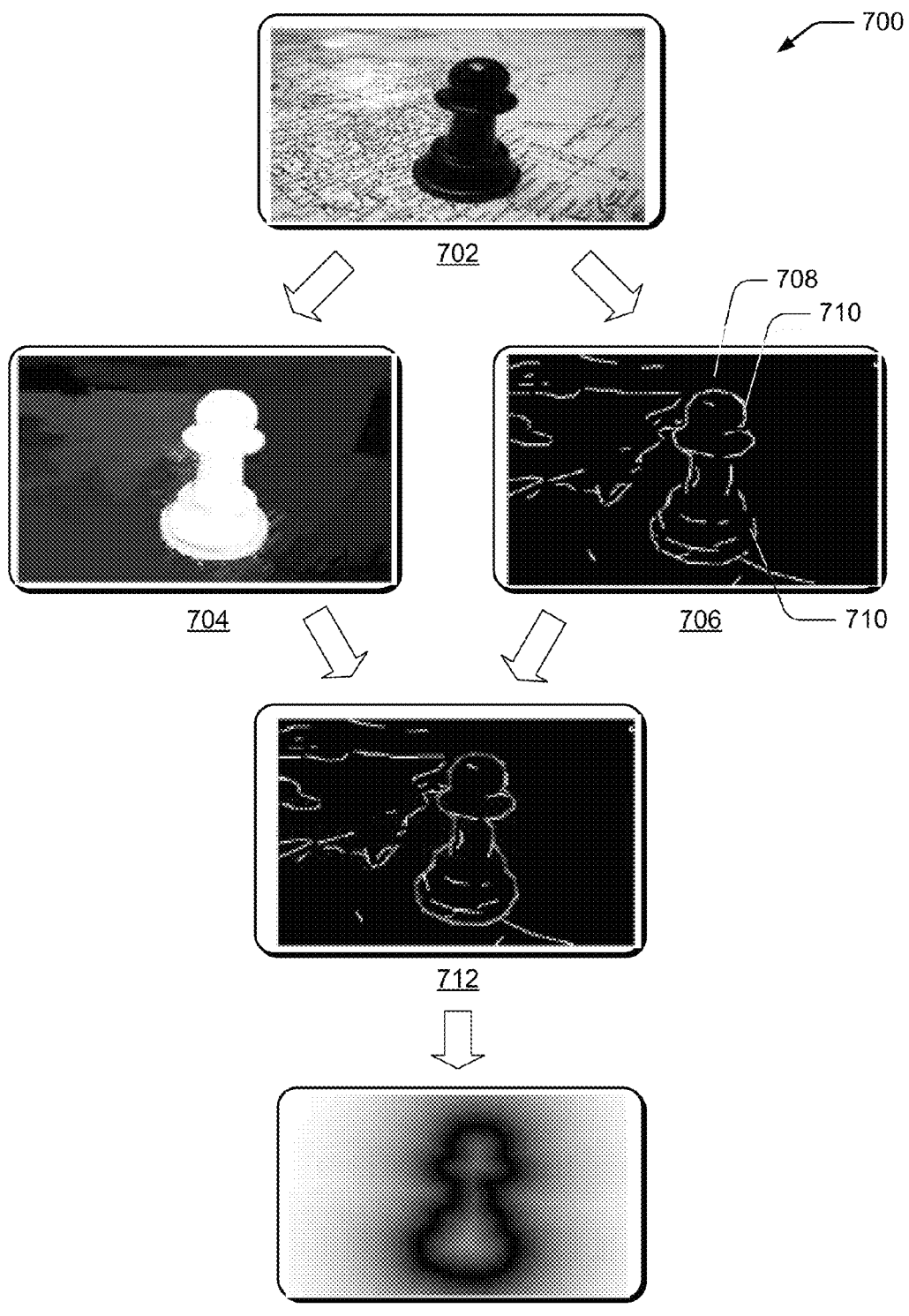
FIG. 7 illustrates an example process of extracting the shape prior (here, a chess piece known as a "pawn") from the input image and the saliency map.

FIG. 7 illustrates an example process 700 of extracting the shape prior (here, a chess piece known as a "pawn") from the input image and utilizing the saliency map. At 702, the input image 114 illustrates a chess piece, the pawn against a printed document as background. In certain instances, several characteristics describe a salient object as being located near the center in the image, having a defined closed boundary, and being different from its immediate context, neighboring regions. At 704, the object application 110 constructs the saliency map. At 706, the object application 110 constructs the line segments 708 around the pawn, shown in white lines. The pawn shown in 706 illustrates the disjointed line segments with gaps 710 shown. The object application 110 fills additional line segments in the gaps 710 when searching for the optimal contour based on equation (3). At 712, the object application 110 cleans other line segments and only keep the contour. Finally, at 714, the object application 110 extracts the shape prior, which is the salient object in a closed contour based at least in part on using equation (4). Based on the optimal closed contour, the extracted shape prior is approximately a polygon shape.

Figure 8:
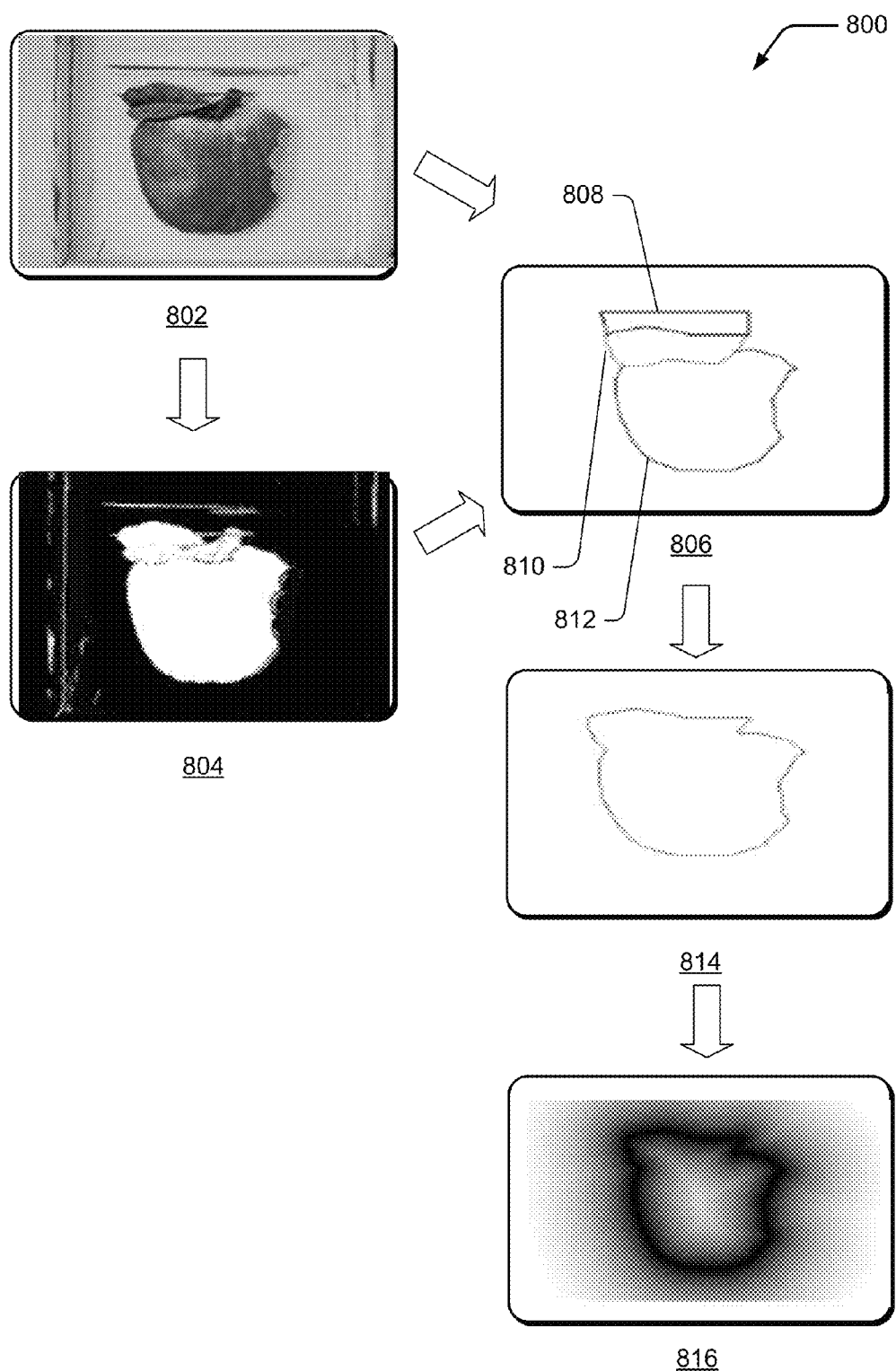
FIG. 8 illustrates an example process of extracting another shape prior (here, an apple with a leaf) from the input image and the saliency map.

FIG. 8 illustrates an example process 800 of extracting another shape prior, an apple with a leaf from the image of the saliency map. At 802, the input image 114 illustrates the apple with the leaf taken against a plain background. At 804, the object application 110 constructs a saliency map with the apple with the leaf shown in white.

At 806, the object application 110 determines there are several parts in the salient object. For instance, the several parts may represent noise 808, the leaf 810, and the apple 812. The object application 110 again connects the line segments and the gap-filling segments around each of the several parts based at least in part on equation (3). Each part may be represented with a contour. The object application 110 further searches for $n_c$ contours. In this implementation, the c will be set to three based on determining there are three separate parts in the salient object. After completing one optimal contour calculation, the object application 110 sets the saliency value inside to be zero. The object application 110 then recalculates the ratio contour algorithm and rejects contours having a self-intersection and having average saliency values smaller than the total saliency. For instance, in an implementation, the total saliency may be set to 0.65. In an implementation, the contour of the apple 812 may be highlighted with a first color or a heavy weight line, a contour of the leaf 810 may be highlighted with a second color or a medium weight line, and a contour of the noise 808 may be highlighted with a third color or a small weight line, to reflect the various parts identified for the salient object.

At 814, the object application 110 merges the contours of the leaf 810 and the apple 812, based on these two separate parts sharing same segments and combining the contours of the several parts when one contour is located inside another contour. Meanwhile, the object application 110 rejects the contour of the noise 808 based on its average saliency value being lower than the total saliency. By identifying multiple separate parts, this presents additional opportunities to accurately determine the shape of the salient object. At 816, the object application 110 extracts the shape prior, which includes the leaf 810 and the apple 812 using equation (4). As mentioned, the shape may be in a form of a polygon.

Segmenting the Salient Object

Figure 9:
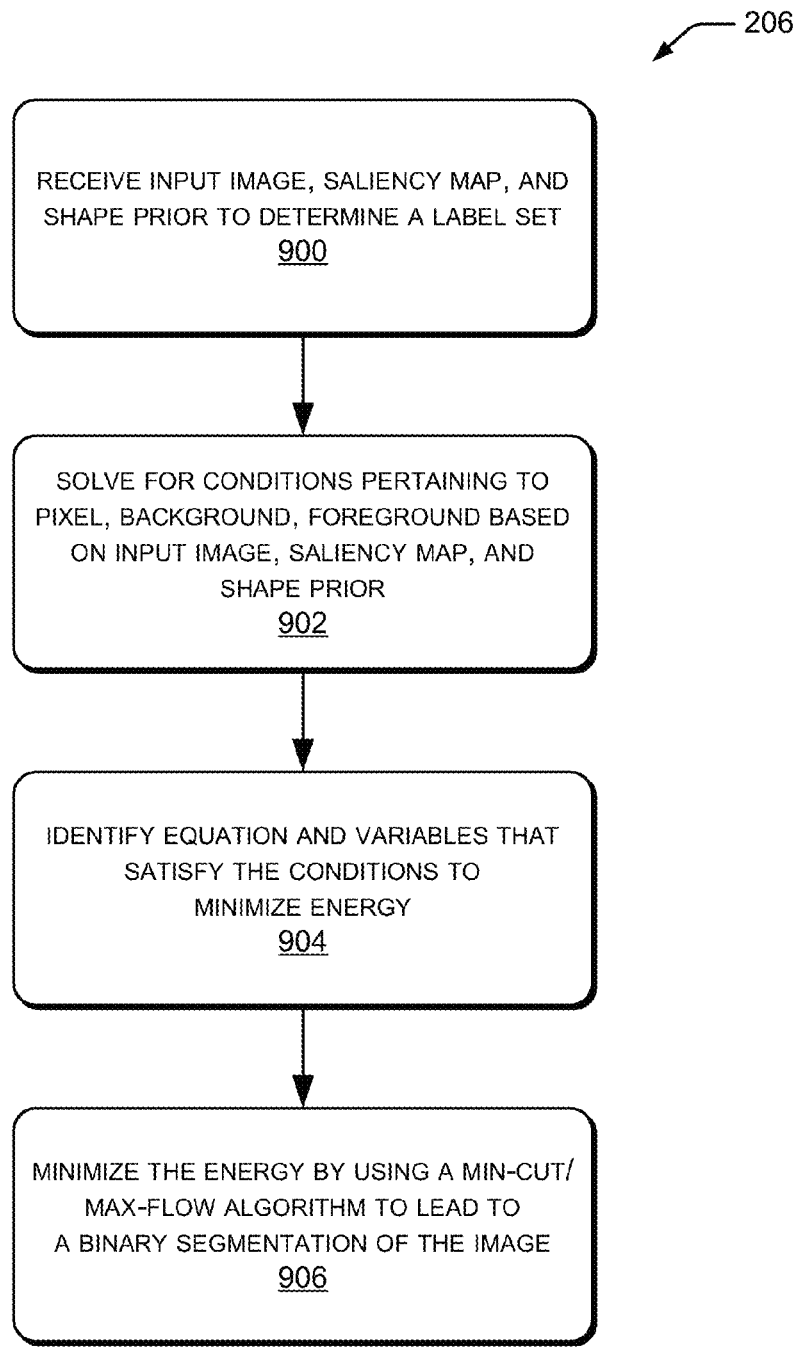
FIG. 9 is a flowchart to illustrate an example process of segmenting the salient object by solving for an energy minimization function.

FIG. 9 is a flowchart to illustrate an example process for phase 206 (discussed at high level above) of segmenting the salient object by solving for energy minimization. At 900, the object application 110 receives the input image 114, the saliency map, and the shape prior to assign a set of label L to each pixel. The set of label includes mapping from the pixels to the salient object, and the background. At 902, the objectives are to solve for conditions pertaining to pixel, background, and foreground based on the input image 114, the saliency map, and the shape prior. For instance, the conditions may include: a label for each pixel $l_p \in \{0,1\}$, where each label pixel is an element of 0, or 1, where 0 corresponds to the neighboring region representing a background and 1 corresponds to the salient object representing a foreground.

At 904, the object application 110 identifies the equation and variables that satisfy the conditions to minimize energy. Thus, the object application 110 minimizes the energy by using the following equation:

$$E(L) = \Sigma_{p \in \mathcal{P}} U(p, l_p, S_m) + \lambda \Sigma_{(p,q) \in \mathcal{N}} \delta(l_p \neq l_q) V(p, q, I, S_p) \quad \text{Equation (5)}$$

where I represents the input image, $\mathcal{P}$ represents a set of image pixels, $S_m$ represents the saliency map, $S_p$ represents the shape prior, and $\mathcal{N}$ represents a 4-connected neighbor system. P and q represent indices of pixels. Additional variables are where $l_p$ represents label for pixel p, $l_q$ represents label for another pixel q, λ represents a trade-off parameter to control the two terms, q represents another pixel, and δ( ) represents an indicator function. The variable l in equation (5) represents the labels of all of the pixels, which are unknown variables and to be determined by minimizing a right side of equation (5).

A data term may be represented by $U(p, l_p, S_m)$ for the following conditions:

$$U(p, l_p, S_m) = \begin{cases} S_m(p), & l_p = 0 \\ 1 - S_m(p), & l_p = 1 \end{cases} \quad \text{Equation (6)}$$

where p represents pixel, $l_p$ represents label of pixel p, and $S_m$ represents the saliency map.

A smoothness term may be represented by $V(p,q,I,S_p)$, which is defined as:

$$V(p,q,I,S_p) = \alpha V_a(p,q,I) + (1-\alpha) V_s(p,q,S_p) \quad \text{Equation (7)}$$

where α controls a relative importance of two parts. In an implementation, α may be set to 0.5. $V_a(p,q,I)$ represents a traditional smoothness term, which may be defined as $$V_a(p, q, I) = \exp\left(-\frac{\|I_p - I_q\|^2}{2\beta}\right),$$

where $\beta = E(\|I_p - I_q\|^2)$.

Another variable, $V_s(p, q, S_p)$ comes from the shape prior, which is represented by the following equation:

$$V_s(p, q, S_p) = S_p\left(\frac{p+q}{2}\right) \approx \frac{S_p(p) + S_p(q)}{2} \quad \text{Equation (8)}$$

The variable, $V_s(p,q,S_p)$ causes the segmentation boundary to be aligned with the computed closed contour.

At 906, the object application 110 may minimize the energy by using a min-cut/max-flow algorithm to lead to a binary segmentation of the image.

Figure 10:
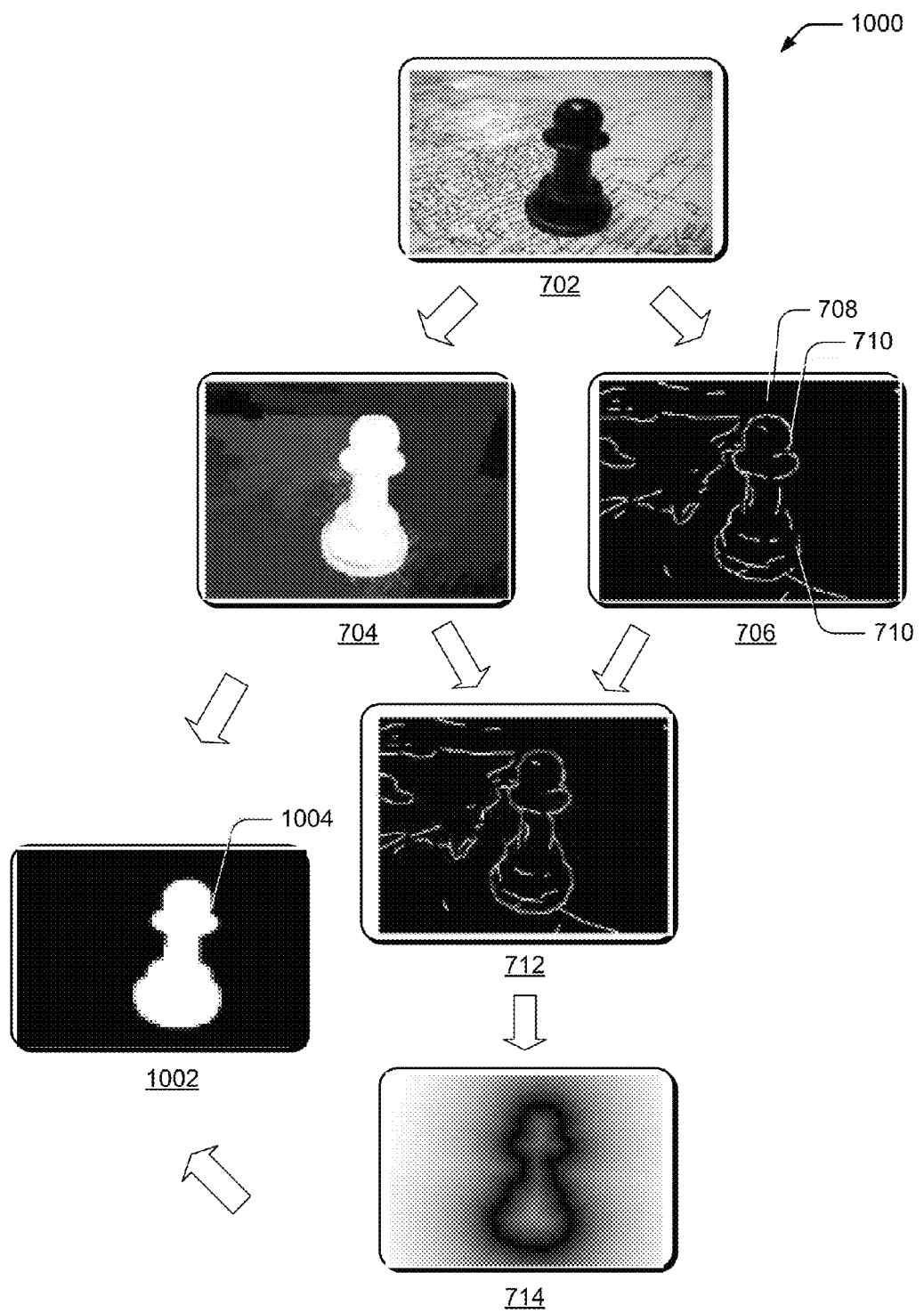
FIG. 10 illustrates an example process of segmenting the salient object (the pawn).

FIG. 10 illustrates an example process 1000 of segmenting the salient object, the pawn from the image. This figure continues from FIG. 7, which illustrates at 702, the input image illustrates a chess piece, the pawn against a printed document as background. At 704, the object application 110 constructs the saliency map. At 706, the object application 110 constructs the line segments 708 around the pawn, shown in white lines. The pawn shown in 706 illustrates the disjointed line segments with gaps 710 shown. The object application 110 fills additional line segments in the gaps 710 when searching for the optimal contour based on equation (3). At 712, the object application 110 cleans other line segments and only keep the contour as shown. Finally, at 714, the object application 110 extracts the shape prior, which is the salient object in a closed contour based at least in part on using equation (4). At 1002, the object application 110 further segments the salient object according to equation (5). The segmented mask 1004 has a more accurate and a smoother boundary than the optimal closed contour shown in 714. The total saliency map and the shape prior merely represent rough estimates of the salient object and may be further optimized.

As discussed above, the fourth phase 208 is to perform an iterative energy minimization to optimize the appearance and the shape of the segmented salient object. The object application 110 updates the saliency map by constructing hue, saturation, and value (HSV) histograms for (a) salient object that represents a foreground and (b) the remaining pixels that represent a background. For example, HSV histograms $H_F$, $H_B$ represent the salient object as the foreground and the background regions, respectively based on the salient object segmentation. The object application 110 dilates the mask of the salient object segmentation to further create a trimap. The trimap may include a pre-segmented image consisting of three regions including the foreground (e.g., the salient object), the background, and unknown. Partial opacity values are then computed only for pixels inside the unknown region. From the trimap, the object application 110 sets the region outside a dilated region as the background and sets an area inside the region as the salient object (e.g., the foreground).

The object application 110 further updates the saliency map $S_m(p)$ using the following equation:

$$S_m(p) = \frac{H_F(b_p)}{H_F(b_p) + H_B(b_p)} \quad \text{Equation (9)}$$

where $H_F$ represents HSV histogram for foreground, $H_B$ represents HSV histogram for background, and $b_p$ represents a color histogram bin of pixels. The less overlap there is occurring between an appearance of the foreground and the background, the more accurate is the updated saliency map.

Based on the updated saliency map, the object application 110 updates the shape prior and then re-segments the image. The object application 110 performs an iterative energy minimization until convergence occurs. In an implementation, the object application may run at least four iterations until convergence.

An example of an algorithm that may be used in the iterative energy minimization is shown below. For brevity, the algorithm refers each of the equations by reference numbers rather than showing each of the equations.
Algorithm: L=SalientObjectSegmentation (I)
 1. Calculate saliency map $S_m$ according to equation (2)
 2. Extract shape prior $S_p$ based on $S_m$, according to equation (4)
 3. Segment image through energy minimization according to equation (5)
 4. Update the saliency map $S_m$ based on current segmentation L according to equation (9)
 5. Go to number 2 to update the shape prior $S_p$, then re-segment the image until convergence.

Thus, this process updates the total saliency map and the shape prior. Overall, the process combines context based saliency and shape prior to achieve better segmentation.

Example Server Implementation

Figure 11:
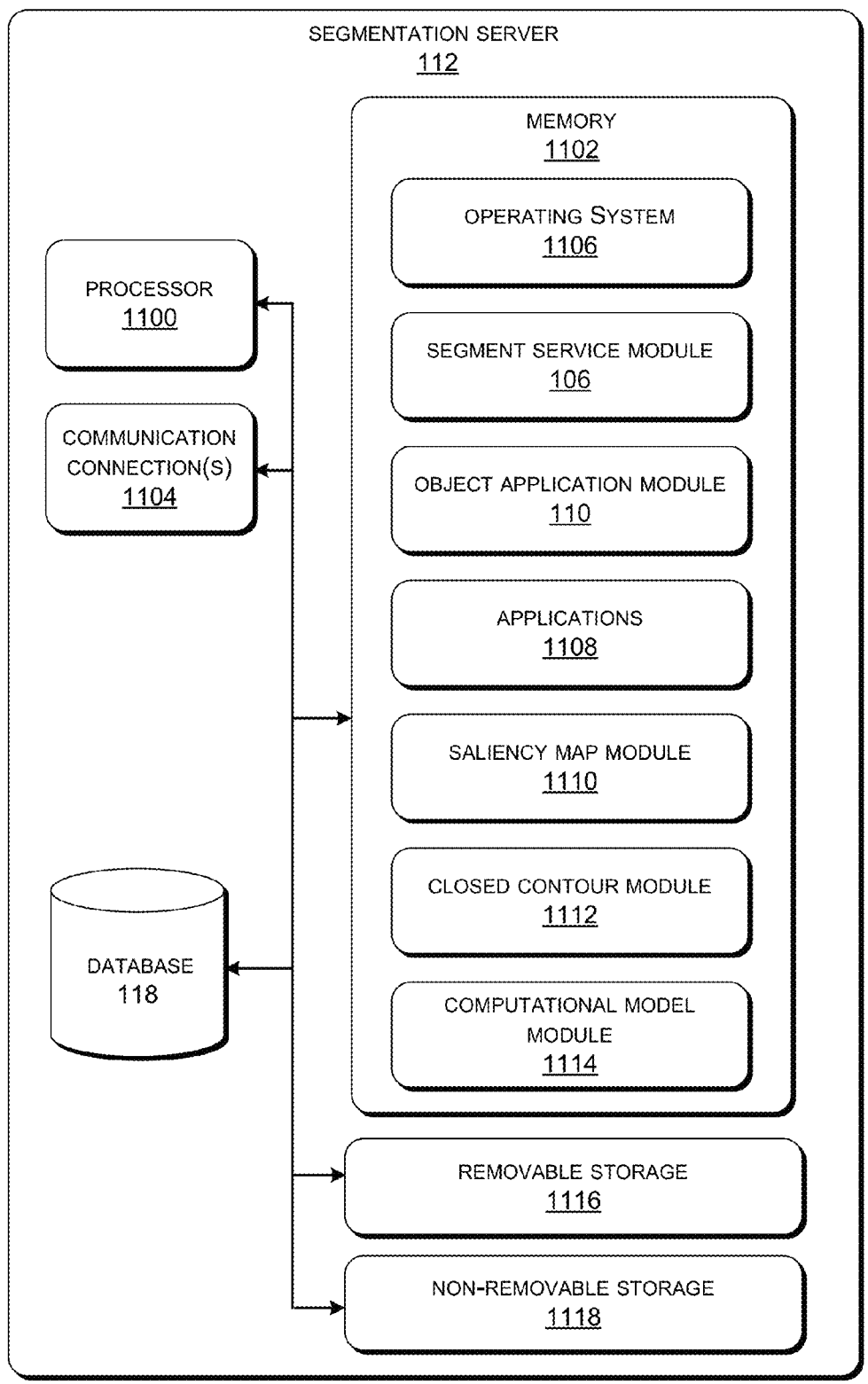
FIG. 11 is a block diagram to illustrate an example server usable with the environment of FIG. 1.

FIG. 11 is a block diagram to illustrate an example server usable with the environment of FIG. 1. The segmentation server 112 may be configured as any suitable system capable of services, which includes, but is not limited to, implementing the segmentation service 106 for image searches, such as providing the search engine to perform the image search. In one example configuration, the server 112 comprises at least one processor 1100, a memory 1102, and a communication connection(s) 1104. The processor(s) 1100 may be implemented as appropriate in hardware, software, firmware, or combinations thereof. Software or firmware implementations of the processor(s) 1100 may include computer-executable or machine-executable instructions written in any suitable programming language to perform the various functions described.

Similar to that of computing environment 100 of FIG. 1, memory 1102 may store program instructions that are loadable and executable on the processor(s) 1100, as well as data generated during the execution of these programs. Depending on the configuration and type of computing device, memory 1102 may be volatile (such as random access memory (RAM)) and/or non-volatile (such as read-only memory (ROM), flash memory, etc.).

The communication connection(s) 1104 may include access to a wide area network (WAN) module, a local area network module (e.g., WiFi), a personal area network module (e.g., Bluetooth), and/or any other suitable communication modules to allow the segmentation server 112 to communicate over the network(s) 104.

Turning to the contents of the memory 1102 in more detail, the memory 1102 may store an operating system 1106, the segmentation service module 106, the object application module 110, and one or more applications 1108 for implementing all or a part of applications and/or services using the segmentation service 106.

The one or more other applications 1108 may include an email application, online services, a calendar application, a navigation module, a game, and the like. The memory 1102 in this implementation may also include a saliency map module 1110, a closed contour module 1112, and a computational model module 1114.

The object application module 110 may perform the operations described with reference to the figures or in combination with the segmentation service module 106, the saliency map module 1110, the closed contour module 1112, and/or the computational model module 1114.

The saliency map module 1110 may perform the operations separately or in conjunction with the object application module 110, as described with reference to FIGS. 3-5. The closed contour module 1112 may perform the operations separately or in conjunction with the object application module 110, as described with reference to FIGS. 6-8. The computational model module 1114 may create models using the equations described above in calculating the saliency values for each region; calculating the saliency for pixel, constructing saliency maps; constructing the optimal closed contour; extracting the shape prior; segmenting the salient object; minimizing the energy; and performing the iterative energy minimization.

The server 112 may include the database 118 to store the computational models, the saliency maps, the extracted shape priors, a collection of segmented images, algorithms, and the like. Alternatively, this information may be stored on other databases.

The server 112 may also include additional removable storage 1116 and/or non-removable storage 1118 including, but not limited to, magnetic storage, optical disks, and/or tape storage. The disk drives and their associated computer-readable media may provide non-volatile storage of computer readable instructions, data structures, program modules, and other data for the computing devices. In some implementations, the memory 1102 may include multiple different types of memory, such as static random access memory (SRAM), dynamic random access memory (DRAM), or ROM.

The server 112 as described above may be implemented in various types of systems or networks. For example, the server may be a part of, including but is not limited to, a client-server system, a peer-to-peer computer network, a distributed network, an enterprise architecture, a local area network, a wide area network, a virtual private network, a storage area network, and the like.

Various instructions, methods, techniques, applications, and modules described herein may be implemented as computer-executable instructions that are executable by one or more computers, servers, or computing devices. Generally, program modules include routines, programs, objects, components, data structures, etc. for performing particular tasks or implementing particular abstract data types. These program modules and the like may be executed as native code or may be downloaded and executed, such as in a virtual machine or other just-in-time compilation execution environment. The functionality of the program modules may be combined or distributed as desired in various implementations. An implementation of these modules and techniques may be stored on or transmitted across some form of computer-readable media.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. A method implemented at least partially by a processor, the method comprising:
    receiving, by the processor, an input image that includes a salient object;
    identifying, by the processor, the salient object, the identifying comprising:
        segmenting the input image into multiple regions, wherein the multiple regions are distinguished from each other based at least on saliency values;
        calculating a saliency value for each of the segmented regions based on scale image levels;
        constructing saliency maps based at least in part on the calculated saliency value for each of the segmented regions, the saliency maps to be constructed for the scale image levels;
        constructing a total saliency map by combining the saliency maps constructed for the scale image levels; and
        connecting a set of line segments that are computed from the input image and utilizing the total saliency map to define a shape prior that has a defined boundary;
    extracting, by the processor, the salient object from the total saliency map and the shape prior; and
    determining, by the processor, an optimal contour of the salient object by rejecting contours that have self-intersections and rejecting contours whose average saliency value is less than a total saliency value.

2. The method of claim 1, wherein the segmenting the input image comprises further fragmenting the input image into multiple groups having different parameters to generate multiple superpixel scales.

3. The method of claim 1, wherein the calculating the saliency value comprises:
    measuring a color distance between a region and a neighboring region;
    comparing the saliency value for each of the segmented regions; and
    applying a Gaussian falloff weight to the saliency value, which includes an average spatial distance of pixels in a region to the center of the input image.

4. The method of claim 1, further comprising computing a minimum of a total length of gaps along the defined boundary over a total saliency value of pixels located inside the defined boundary.

5. The method of claim 4, further comprising defining at least a spatial distance between a pixel and the defined boundary.

6. The method of claim 1, further comprising:
    determining that the salient object includes several parts and representing each part with a contour; and
    determining the optimal contour of the salient object further comprises:
        merging the contours of the several parts when the contours share same line segments, or
        combining the contours of the several parts when one contour is located inside another contour.

7. The method of claim 1, further comprising filling in gaps on the salient object by adding, by the processor, a set of gap-filling segments to form a closed contour by utilizing the total saliency map.

8. The method of claim 1, further comprising:
    assigning a label to each pixel in the input image based at least in part on a criteria that each label pixel is an element of 0 or 1, where 0 corresponds to the pixel belonging to a background and 1 corresponds to the pixel belonging to the salient object representing a foreground;
    minimizing an energy function of the set of labels to further define the salient object; and
    segmenting the salient object representing the foreground from the remaining regions representing the background.

9. The method of claim 8, further comprising:
    updating the total saliency map by constructing hue, saturation, and value (HSV) histograms for (a) the salient object that represents the foreground and (b) the regions that represent the background;
    updating the shape prior based on the salient object detected; and
    performing an iterative energy minimization until convergence based at least in part on the updated saliency map and the updated shape prior to update the salient object.

10. One or more computer storage devices encoded with instructions that, when executed by one or more processors, cause the one or more processors to perform acts comprising:
    receiving an input image that includes a salient object;
    fragmenting the input image into multiple regions to create a saliency map;
    calculating a saliency value for each of the multiple regions of the input image;

forming a defined boundary with a set of line segments from the input image to define a shape prior; and determining an optimal contour of the salient object by:
    forming contours around multiple parts;
    merging the contours of the multiple parts when the contours share same line segments;
    combining two or more of the contours when one contour is located inside another contour;
    rejecting one or more of the contours that have self-intersections; and
    rejecting one or more of the contours whose average saliency value is less than a total saliency value.

11. The computer storage devices of claim 10, wherein the calculating the saliency value comprises
    propagating the saliency value from each of the regions to pixels of the corresponding region.

12. The computer storage devices of claim 10, wherein fragmenting the input image into multiple regions to create a saliency map comprises:
    fragmenting the input image at a first scale level to create a first saliency map;
    fragmenting the input image at a second scale level different than the first scale level to create a second saliency map; and
    combining the first saliency map and the second saliency map to create the saliency map.

13. The computer storage devices of claim 10, further comprising:
    detecting line segments from the input image; and
    adding a set of gap-filling segments to fill in gaps of the detected line segments to form a closed contour and based on the closed contour compute the shape prior.

14. The computer storage devices of claim 10, further comprising:
    assigning a set of labels to each label pixel in the input image by specifying that each label pixel is an element of 0 or 1, where 0 represents the pixel belonging to a background and 1 represents the pixel belonging to the salient object as foreground.

15. The computer storage devices of claim 14, further comprising:
    presenting a user interface to receive the input image as a user query;
    utilizing the shape prior and the saliency map to identify an appearance and a shape of the salient object; and
    searching for images similar in appearance to the salient object.

16. A system comprising:
    a memory;
    one or more processors coupled to the memory;
    an object application module executed on the one or more processors to receive an input image that includes a salient object;
    a saliency map module executed on the one or more processors to construct a saliency map by fragmenting the input image into multiple regions,
    the saliency map module executed on the one or more processors to calculate a saliency value for each region by computing a color difference between a region and neighboring regions, the saliency value of each region being weighted by Gaussian falloff weight that measures a distance of the region to an image center;
    the object application module executed on the one or more processors to propagate the saliency value for each region to pixels; and
    a closed contour module executed on the one or more processors to determine an optimal contour of the salient object by rejecting contours that have self-intersections and rejecting contours whose average saliency value is less than a total saliency value.

17. The system of claim 16, wherein the saliency map module is further executed on the one or more processors to:
    construct saliency maps based at least in part on the calculated saliency value for each region, the saliency maps to be constructed for scale image levels; and
    constructing a total saliency map by combining the saliency maps constructed for the scale image levels.

18. The system of claim 17, wherein the closed contour module is further executed on the one or more processors to perform acts of:
    connecting a set of line segments in the saliency map;
    filling in gaps between the set of line segments by adding a set of gap-filling segments to define a shape prior having a closed boundary; and
    extracting a shape prior based on the closed boundary from the saliency map.

19. The system of claim 18, wherein the object application module is further executed on the one or more processors to assign a set of labels to each pixel in the input image by specifying that each pixel is an element of 0 or 1, where 0 represents pixels belonging to a background and 1 represents pixels belonging to the salient object as a foreground; and
    the object application module is further executed on the one or more processors to perform an iterative energy minimization until convergence to update the total extracted saliency map and the shape prior.

20. The system of claim 19, wherein the object application module is further executed on the one or more processors to present a user interface to receive the input image as a user query;
    the object application module is further executed on the one or more processors to search for images similar in appearance to the salient object; and
    the object application module is further executed on the one or more processors to present the user interface to display a list of images similar in appearance to the salient object based at least in part on the searching.

* * * * *